(12) United States Patent
Bertino

(10) Patent No.: US 10,251,342 B2
(45) Date of Patent: Apr. 9, 2019

(54) CHOPPING MODULE HAVING BOX-SHAPED BODY, ROLLERS, SHEARBAR, AND ROTATING BLADE ASSEMBLY

(71) Applicant: INDÚSTRIAS REUNIDAS COLOMBO LTDA, Pindorama (BR)

(72) Inventor: Luiz Henrique Bertino, Pindorama (BR)

(73) Assignee: INDÚSTRIAS REUNIDAS COLOMBO LTDA, Pindorama (BR)

( * ) Notice: Subject to any disclaimer, the term of this patent is extended or adjusted under 35 U.S.C. 154(b) by 25 days.

(21) Appl. No.: 15/496,914

(22) Filed: Apr. 25, 2017

(65) Prior Publication Data

US 2018/0116118 A1 May 3, 2018

(30) Foreign Application Priority Data

Nov. 1, 2016 (BR) ...................... 10 2016 025547 3

(51) Int. Cl.
| | | |
|---|---|---|
| *A01D 43/08* | (2006.01) | |
| *A01F 29/01* | (2006.01) | |
| *A01F 29/02* | (2006.01) | |
| *A01F 29/06* | (2006.01) | |
| *A01F 29/10* | (2006.01) | |
| *A01D 45/10* | (2006.01) | |

(52) U.S. Cl.
CPC ........... *A01D 43/086* (2013.01); *A01D 43/08* (2013.01); *A01F 29/01* (2013.01); *A01F 29/02* (2013.01); *A01F 29/06* (2013.01); *A01F 29/10* (2013.01); *A01D 45/10* (2013.01)

(58) Field of Classification Search
CPC ....... A01D 43/086; A01D 43/08; A01F 29/06; A01F 29/02; A01F 29/01; A01F 29/00
See application file for complete search history.

(56) References Cited

U.S. PATENT DOCUMENTS

| | | | |
|---|---|---|---|
| 3,141,281 A | 7/1964 | Gaunt et al. | |
| 3,482,690 A | 12/1969 | Driller | |
| 3,530,650 A * | 9/1970 | Phillips | ............... A01D 43/088 56/13.3 |
| 3,599,404 A | 8/1971 | Fernandez et al. | |

(Continued)

FOREIGN PATENT DOCUMENTS

| | | |
|---|---|---|
| BR | PI 7605903 | 4/1978 |
| BR | PI 7606656 | 5/1978 |

(Continued)

*Primary Examiner* — Arpad Fabian-Kovacs
(74) *Attorney, Agent, or Firm* — B. Aaron Schulman, Esq.; Stites & Harbison, PLLC

(57) ABSTRACT

A chopping module which pulls plants inside the module and chops them into billets, comprising a box-shaped body with three open sides, a front inlet for plants to be chopped, a rear outlet for chopped plants and a lower outlet for residues. Plants are pulled by two crosswise pairs of rollers, after which plants are chopped by a rotating blade assembly and a fixed shearbar, which are aligned parallel to the pulling rollers. Between the pulling rollers, a passageway is formed for the plants to be chopped. After the fixed shearbar, said passageway continues in the form of a slide sloping downwards to the rear outlet. The rotating blade assembly is located above the slide and next to the fixed shearbar.

5 Claims, 25 Drawing Sheets

(56) References Cited

U.S. PATENT DOCUMENTS

| | | | |
|---|---|---|---|
| 3,673,774 A | 7/1972 | Mizzi | |
| 3,788,048 A | 1/1974 | Stiff et al. | |
| 3,805,660 A * | 4/1974 | Burrough | A01F 29/095 241/101.762 |
| 3,830,046 A | 8/1974 | Rollitt | |
| 3,848,399 A | 11/1974 | Makeham | |
| 3,851,450 A * | 12/1974 | Nelson | A01F 29/06 56/14.4 |
| 3,867,808 A * | 2/1975 | Kidd | A01F 29/01 56/14.1 |
| 3,958,397 A | 5/1976 | Stiff | |
| 4,019,308 A | 4/1977 | Quick | |
| 4,055,309 A * | 10/1977 | Fleming | A01F 29/095 144/218 |
| 4,065,912 A | 1/1978 | Quick | |
| 4,121,778 A | 10/1978 | Quick | |
| 4,133,165 A * | 1/1979 | Hoch | A01F 29/01 56/14.3 |
| 4,190,209 A * | 2/1980 | deBuhr | A01F 29/095 241/101.762 |
| 4,295,325 A | 10/1981 | Cannavan | |
| 4,312,481 A * | 1/1982 | Carey | A01F 29/095 241/101.71 |
| 4,474,336 A * | 10/1984 | Fleming | A01F 29/06 144/218 |
| 4,478,030 A * | 10/1984 | Druais | A01F 29/06 241/220 |
| 4,505,434 A * | 3/1985 | Martenas | A01F 29/06 241/101.76 |
| 4,506,839 A * | 3/1985 | Black | A01F 29/06 241/101.763 |
| 4,651,936 A * | 3/1987 | Fleming | A01F 29/095 144/176 |
| 4,728,046 A * | 3/1988 | Bruer | A01D 43/081 241/101.742 |
| 4,747,260 A * | 5/1988 | Petrasch | A01F 29/10 241/101.742 |
| 5,092,110 A | 3/1992 | Dommert et al. | |
| 5,622,034 A | 4/1997 | Dommert | |
| 5,822,962 A * | 10/1998 | Wagstaff | A01D 43/10 56/16.4 R |
| 6,062,009 A | 5/2000 | Caillouet | |
| 6,131,837 A * | 10/2000 | Wanner | A01D 43/086 241/101.742 |
| 8,783,150 B2 * | 7/2014 | Boss | B26D 1/385 83/672 |
| 2014/0325950 A1 * | 11/2014 | Verhoye | A01F 29/12 56/71 |
| 2015/0013297 A1 * | 1/2015 | Bacon | A01F 29/06 56/16.4 A |
| 2016/0235010 A1 * | 8/2016 | Fattepur | A01F 29/06 |
| 2018/0007835 A1 * | 1/2018 | Birkhofer | A01F 11/06 |

FOREIGN PATENT DOCUMENTS

| | | |
|---|---|---|
| BR | PI 7707999 | 5/1978 |
| BR | PI 7705738 | 6/1978 |
| BR | PI 8703604 | 1/1989 |
| BR | PI 8902829 | 11/1990 |
| BR | MU 7101347 | 2/1993 |
| BR | MU 8001923 | 4/2002 |
| BR | MU 8300417-3 | 8/2003 |
| BR | PI 0600534-9 | 10/2007 |
| BR | PI 0601956-0 | 1/2008 |
| BR | MU 8901801-0 | 4/2011 |
| BR | MU 9002255-6 | 1/2012 |
| BR | PI 1002475-1 | 5/2012 |
| BR | 202014023751-3 | 6/2015 |
| BR | 102014011258-8 | 12/2015 |
| BR | 222015007941-7 | 6/2016 |
| DE | 102013004274 A1 * | 9/2014 ............ A01D 43/08 |
| GB | 1356698 A * | 6/1974 ............ A01D 43/08 |

* cited by examiner

A-A

A-A

B-B

C-C

D-D

Det. E

Det. F

G-G

A-A

CHOPPING MODULE HAVING BOX-SHAPED BODY, ROLLERS, SHEARBAR, AND ROTATING BLADE ASSEMBLY

FIELD OF THE INVENTION

The present invention refers more particularly to a module for chopping plants from different crops, such as: cotton, sorghum, fodder sorghum, sugar cane, energy cane, fodder cane and others. The module is an independent device driven by hydraulic motors. Consequently, the module has all the features necessary for mounting in various harvesters, including combine harvesters with the ability to cut, harvest, and chop various crops or a single specific crop which, for any reason, should be chopped soon after harvesting. For example, sugar cane, wherein the harvested material is cut into billets.

STATE OF THE ART

There are currently a wide variety of devices used to cut or chop different plants. Some of these devices are independent machines, while others are integrated into different harvesters, as taught, for example, by the following documents: BR202014023751, BR222015007941, BR102014011258, BRMU7101347, BRMU8001923, BRMU8300417, BRMU8901801, BRMU9002255, BRPI0600534, BRPI0601956, BRPI1002475, BRPI7605903, BRPI7606656, BRPI7705738 BRPI7707999 BRPI8703604 BRPI8902829, US003141281, US003482690, US003599404, US003673774, US003788048, US003830046, US003848399, US003958397, US004019308, US004065912, US004121778, US004295325, US005092110, US005622034 and USA106062009.

All these documents provide a continuous form of cutting, i.e. on one side, a plant is pulled inside the device and, subsequently, a rotating blade assembly cuts the plant into segments which are thrown outside, on the opposite side of the inlet of the device.

The most significant part in determining the efficiency of the device is the cutting system. It is necessary for the cutting system to be implemented in such a way as to provide speed and cutting efficiency while also having sufficient durability.

Therefore, we have noticed in the conventional devices that the internal arrangement of the cutting system could be considerably improved.

OBJECTS OF THE INVENTION

The first object of the invention is to provide a chopping module which can be easily mounted into a harvester, thereby adding one or more functions, since the harvested crop is not always chopped. In some cases, the chopping step is required, and may be performed simultaneously with the harvesting process. The present chopping module can easily be installed into a harvester, interposing itself between given components and subsequently working jointly with the other parts of the machine.

The second object of the invention is the embodiment of a chopping module which is completely different from conventional modules, i.e. the chopping module is divided into two parts, a fixed shearbar and a rotating blade assembly. The two components occupy the whole crosswise section of the device and are located just after a set of rollers pulling the plants inside the module. The rotating blade assembly comprises blades which are strategically positioned along the circumference of a rotating roller, so that the blades can be crossed by the shearbar. Therefore, the plants entering the device are positioned to pass between the moving blades and the fixed shearbar, wherein the cut is performed with precision, since each moving blade has a strategical position along the circumference of the rotating roller. Thus, each moving blade orthogonally crosses the fixed shearbar, cutting the plants passing between them. Additionally, the rotating roller for the moving blades is divided by multiple discs, among which there are walls located like helices which constitute supports for the moving blades. These walls also throw the cut billets outside the module.

Therefore, the present chopping module is a compact device for interposition between other components of a harvester, wherein the cutting system has advantageous productivity and efficiency, and the embodiment as proposed for said cutting module also aims to provide other advantages, especially those related to corrective and preventative maintenance.

DETAILED DESCRIPTION OF THE INVENTION

Figure 1:
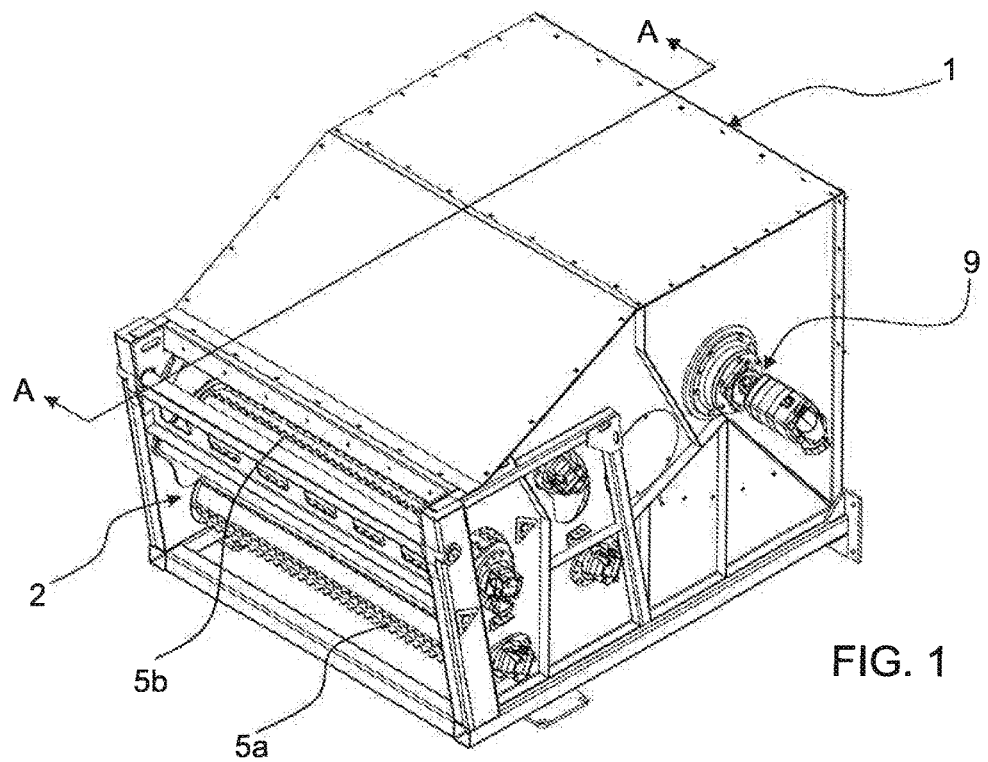
FIG. 1 shows the assembled module from a front upper angle perspective view.
Figure 2:
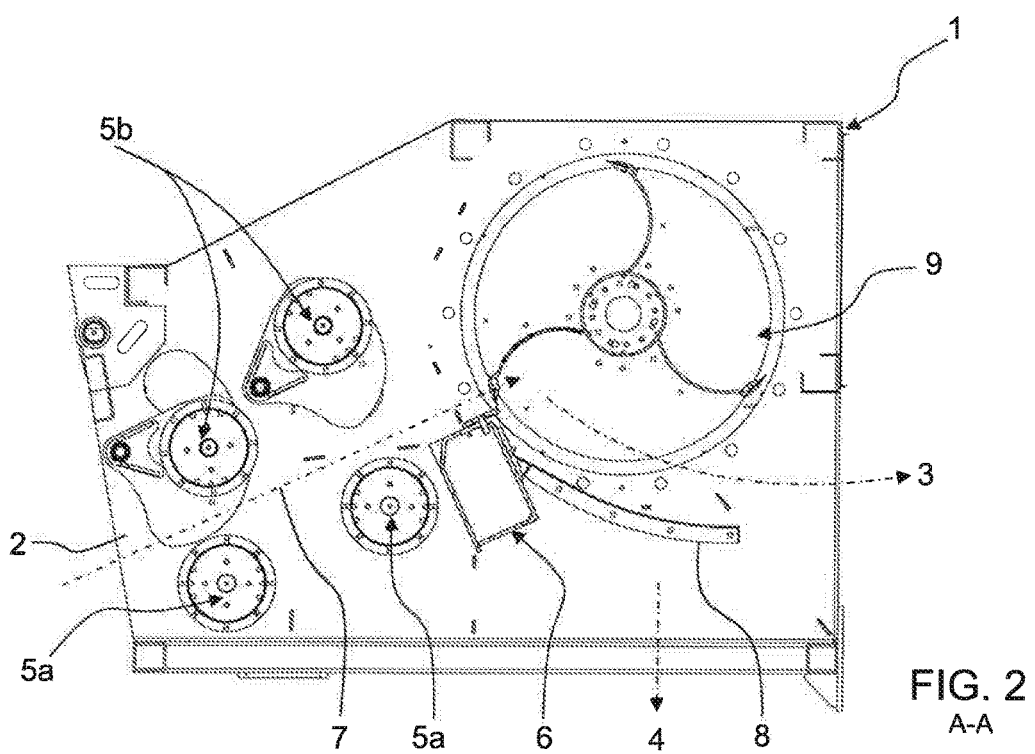
FIG. 2 shows a view of the lengthwise cut "A-A" as indicated by FIG. 1.
Figure 3:
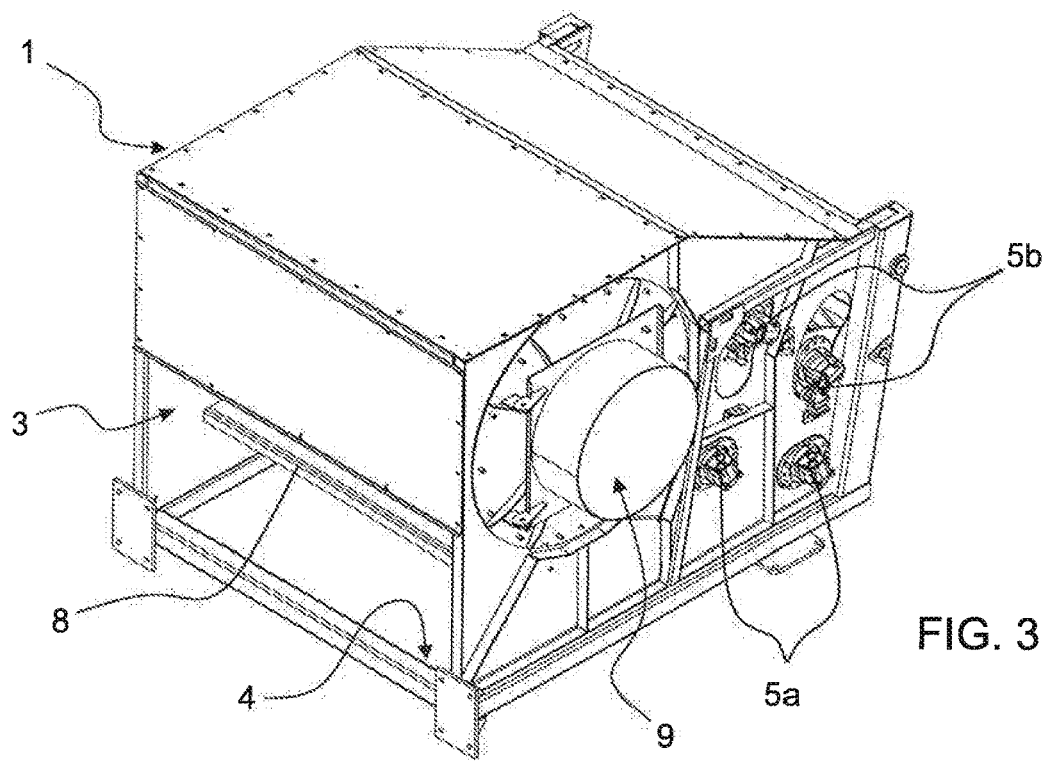
FIG. 3 shows the module from a rear upper angle isometric view.
Figure 4:
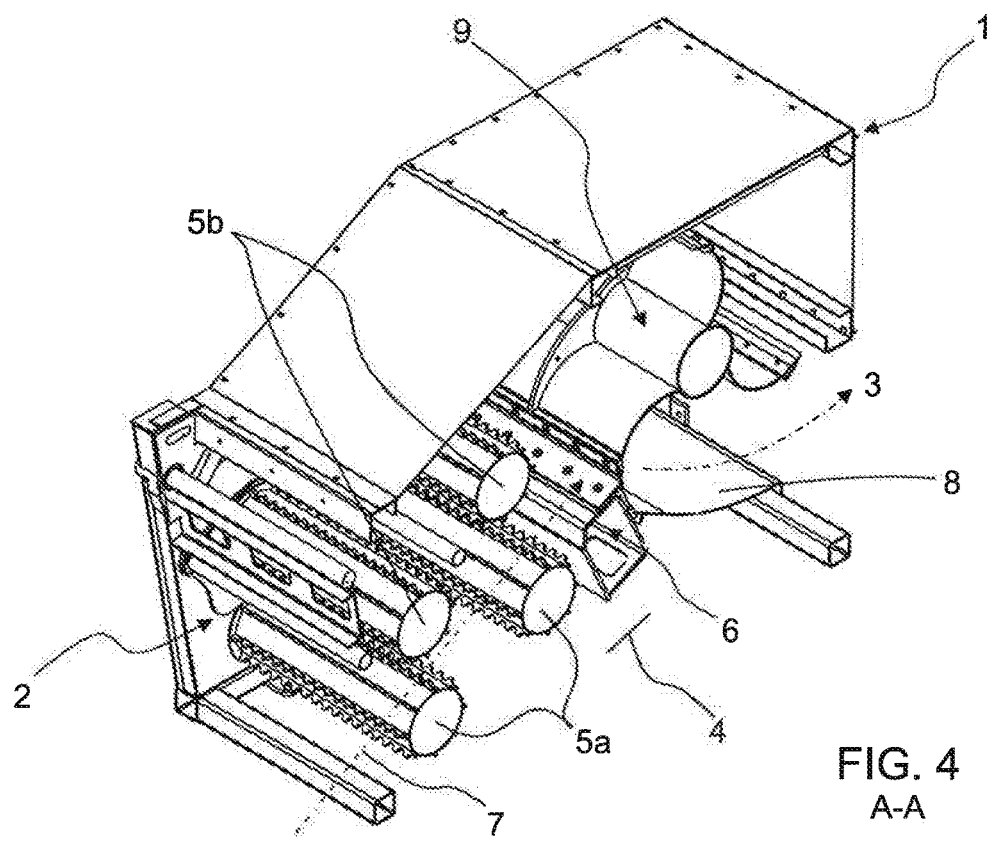
FIG. 4 is an isometric view of the "A-A" cut.
Figure 5:
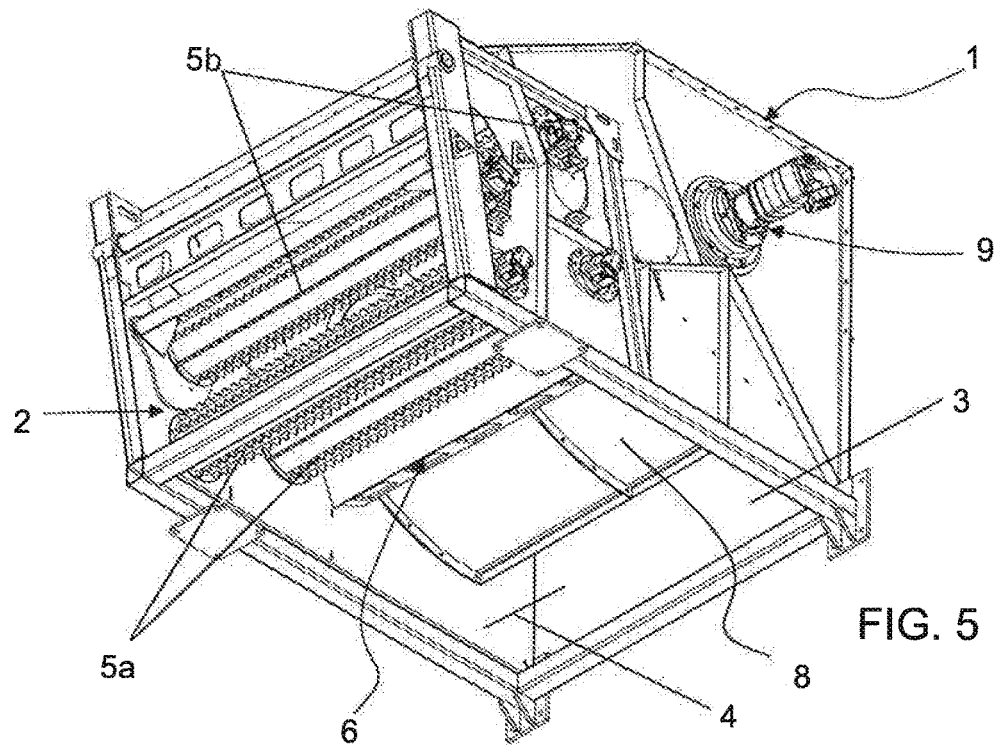
FIG. 5 shows the module from a front lower angle isometric view.
Figure 6:
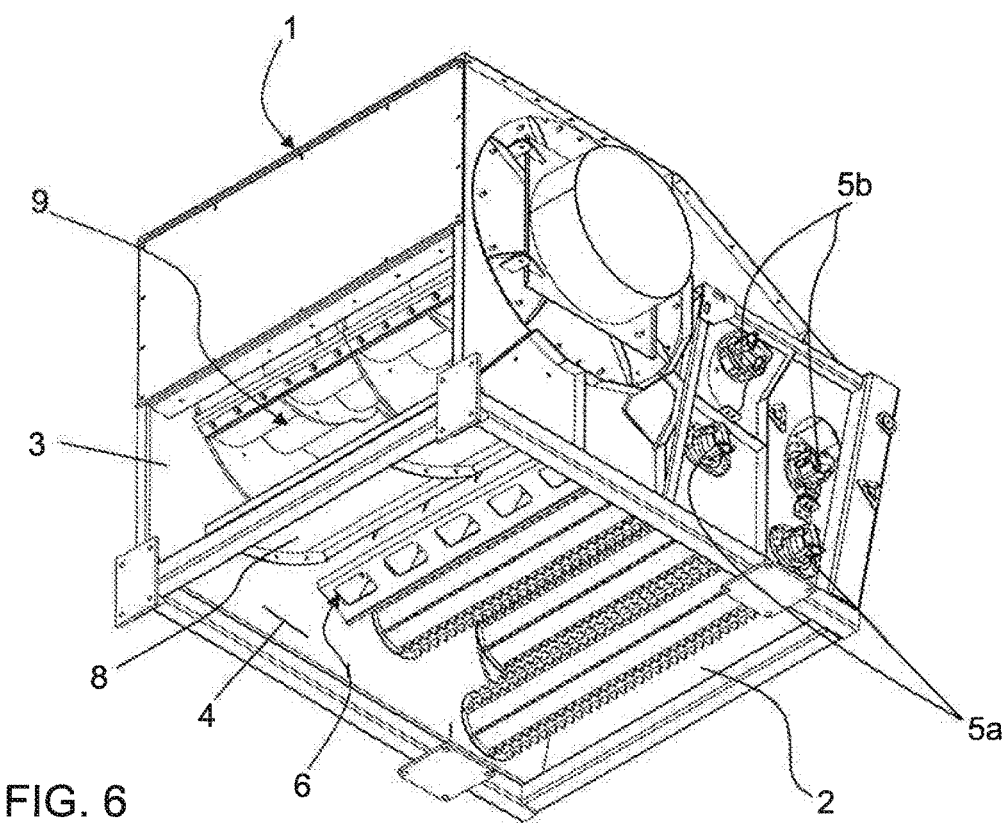
FIG. 6 shows the module from a rear lower angle isometric view.

According to these illustrations and their details, more particularly FIGS. 1 to 6, the chopping module of the present invention, comprises: a parallelepiped box-shaped body (1), with three open sides, the first one configuring a front inlet (2) for the plant to be chopped, the second one configuring a rear outlet (3) for the chopped plant, and the third one configuring a lower outlet (4) for residues.

Adjacent to the front inlet (2), there are two crosswise pairs of rotating rollers for pulling the plants to be chopped, a lower pair of stationary rollers (5a) and an upper pair of floating rollers (5b).

Adjacent to the lower pair of stationary rollers (5a) and the upper pair of floating rollers (5b), a fixed shearbar (6) is mounted crosswise, aligned parallel to the lower pair of stationary rollers (5a), wherein, a passageway (7) for the plants to be chopped is formed between the lower pair of stationary rollers (5a) and the upper pair of floating rollers (5b). After the fixed shearbar (6), the passageway (7) has an extension in the form of a slide (8) sloping downwards to the rear outlet (3) for the chopped plants; and a crosswise rotating blade assembly (9), located above the slide (8) adjacent to the fixed shearbar (6).

Figure 7:
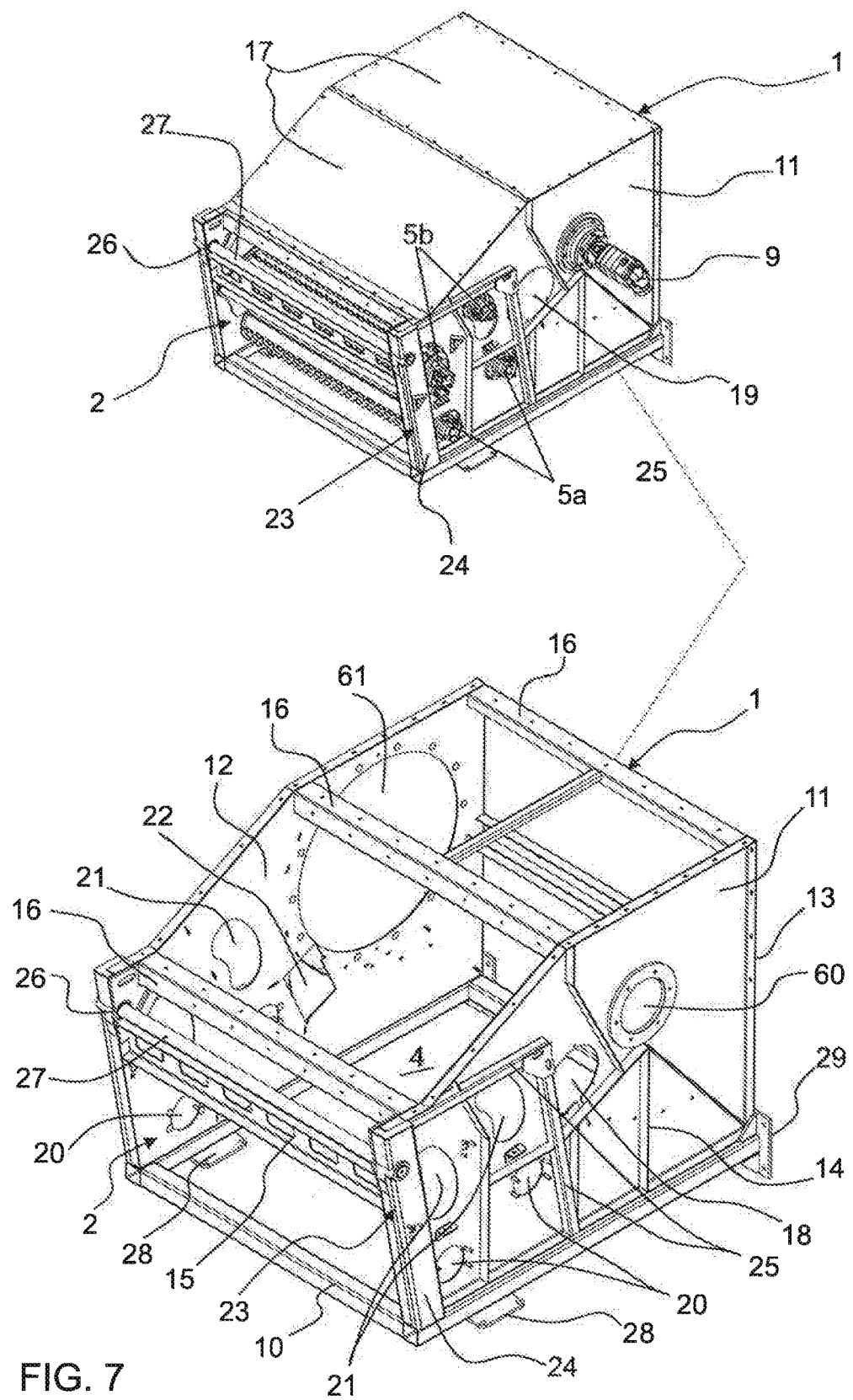
FIG. 7 shows two perspective views, one reference view and one structural view of the module from a front upper angle.
Figure 8:
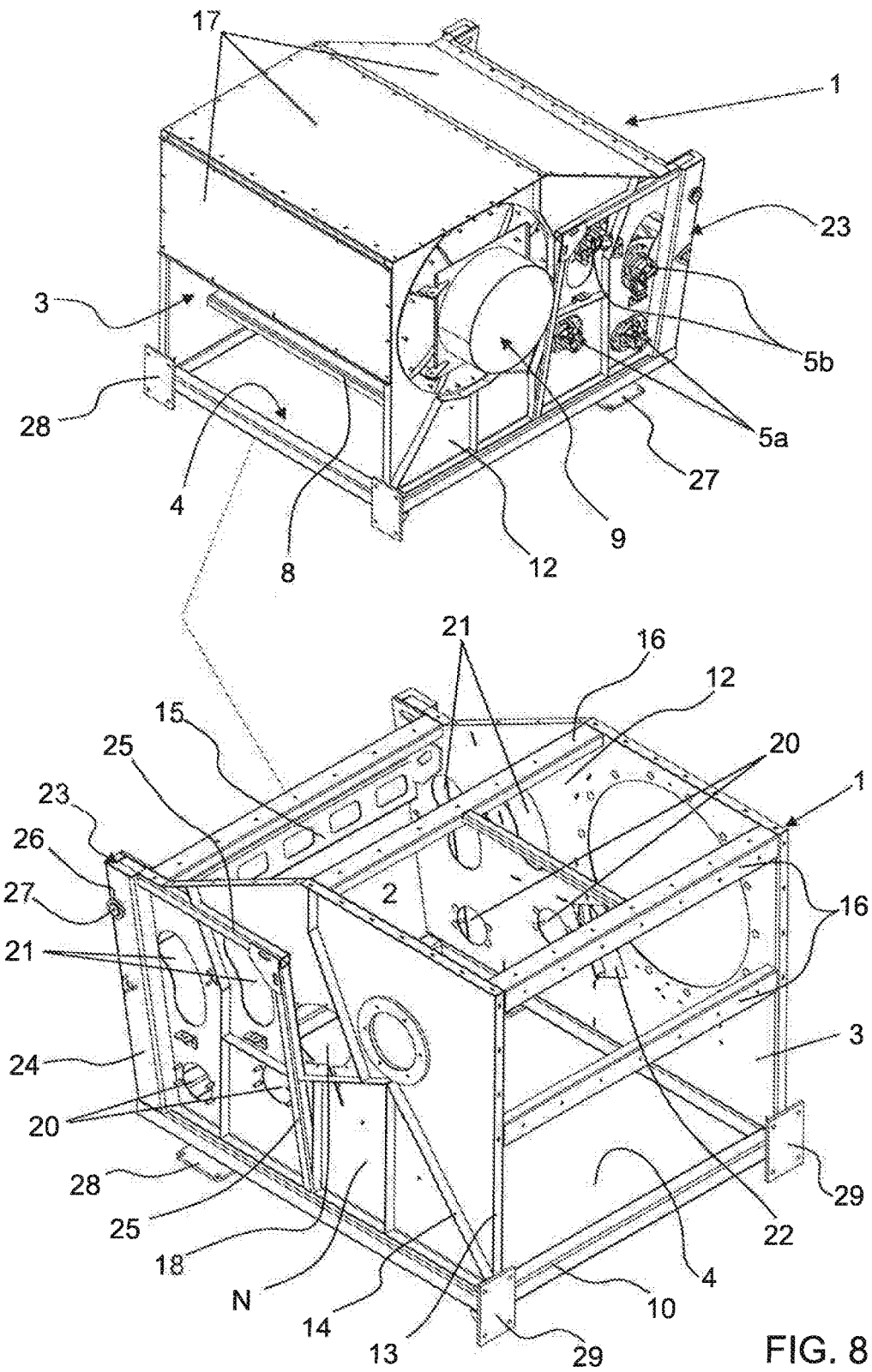
FIG. 8 also shows two perspective views, one reference view and one structural view of the module from a rear upper angle.
Figure 9:
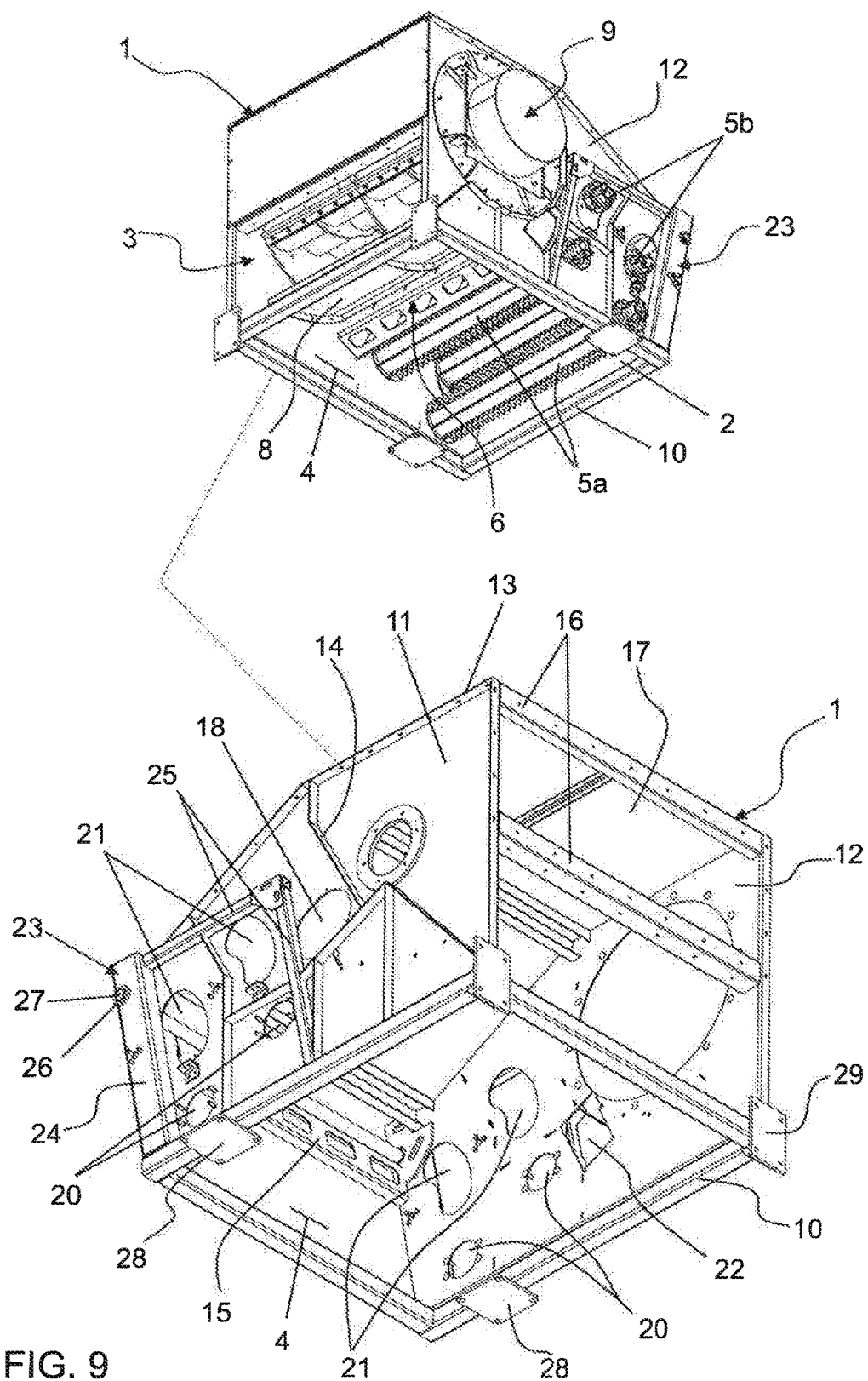
FIG. 9 shows two perspective views, one reference view and one structural view of the module from a rear lower angle.

FIGS. 7, 8 and 9 show in detail the parallelepiped box-shaped body (1), showing that it comprises a metal tube base forming a frame (10) which outlines the lower outlet (4) for residues and forms a support for a first side panel (11) and a second side panel (12), both with contouring flaps (13) and reinforcement ribs (14) on the outside. On the inside, the side panels (11) and (12) are interconnected by a front metal crossbeam (15), and upper and rear metal crossbeams (16), wherein the front metal crossbeam (15), the frame (10), and the side panels (11) and (12) limit the front inlet (2) for harvested plants to be chopped. The upper metal crossbeam (16) is placed over the upper portion and the rear metal crossbeam (16) is placed on the rear portion, the latter limiting the rear outlet (3). The upper and rear metal crossbeams (16) receive cover panels (17). On the upper portion, the cover panels (17) define two planes, a horizontal and a sloped plane, wherein, on that portion, side panels (11) and (12) have an ordinary trapezoid configuration.

The first side panel (11) includes a first opening (18) with a cover (19), aligned with a rectangular opening (22) on the second side panel (12). The first side panel (11) also includes circular openings (20), and oblong openings (21) aligned to respective circular openings (20) and oblong openings (21) equally positioned on the second side panel (12). The circular openings (20) constituting fixing points for the respective edges of the lower pair of stationary rollers (5a), the oblong openings (21) constituting fixing points for the respective edges of the upper pair of floating rollers (5b), and the first opening (18) and the rectangular opening (22) constituting fixing points of the fixed shearbar (6).

The box-shaped body (1) also includes a complementary structure (23) located at a front portion. The complementary structure (23) is formed by a frame on each side, each one formed by a vertical tube (24) on the outside of the box-shaped body (1), next to the front edge of the respective side panels (11) and (12), the vertical tubes (24) interlinked to horizontal tubes in a square (25). The vertical tubes (24) also constitute reinforcements for positioning bushings (26) with rotating support for the edges of a round bar (27) located above the front metal crossbeam (15). The round bar (27) constitutes a point for coupling the module to the respective parts of a harvester. The frame (10) also distributes lower plate portions (28) and rear plate portions (29) forming additional fixing points.

Figure 10:
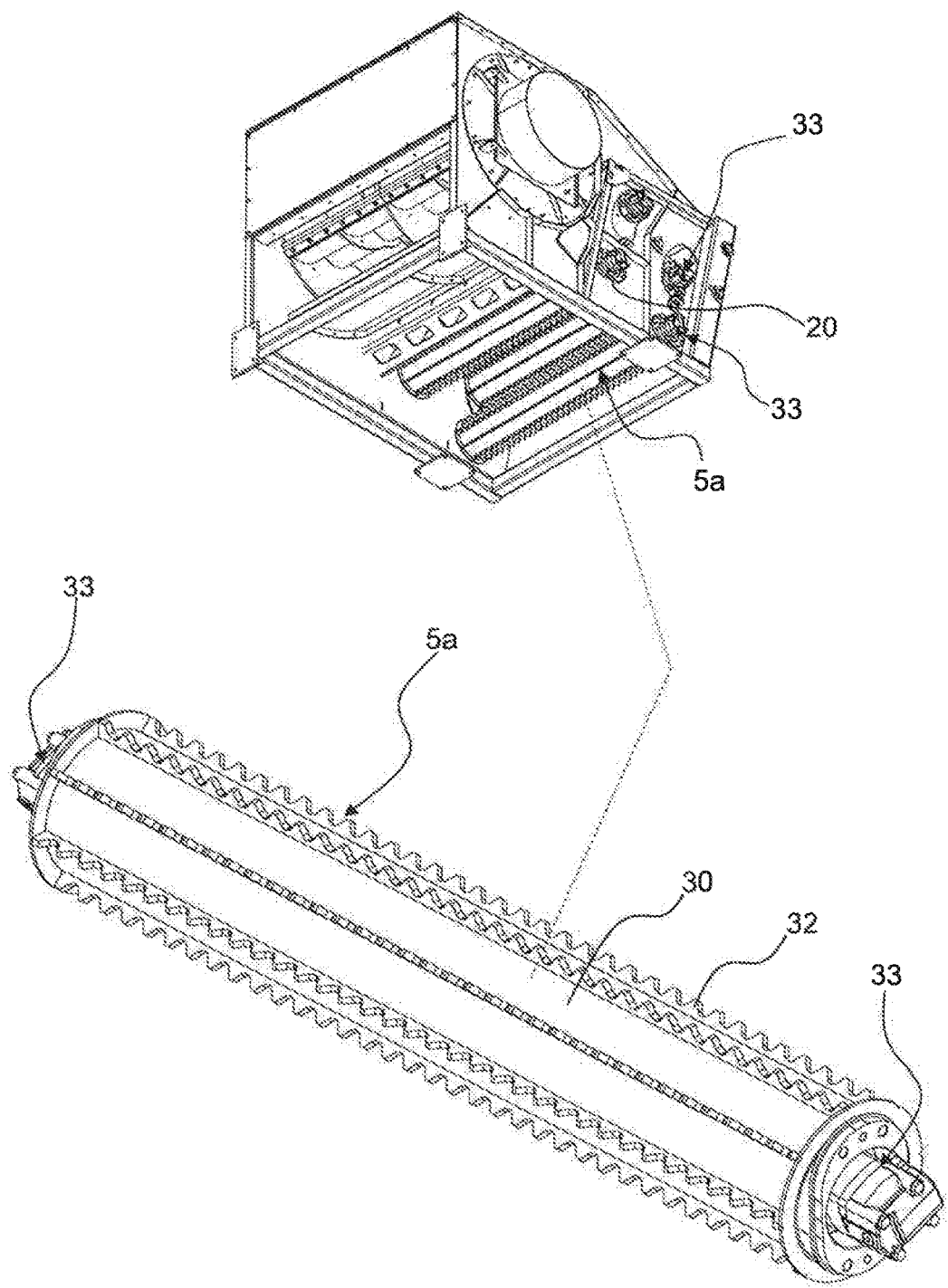
FIG. 10 shows a reference perspective view and a perspective view of one of the stationary rollers which pull the plant to be chopped.
Figure 11:
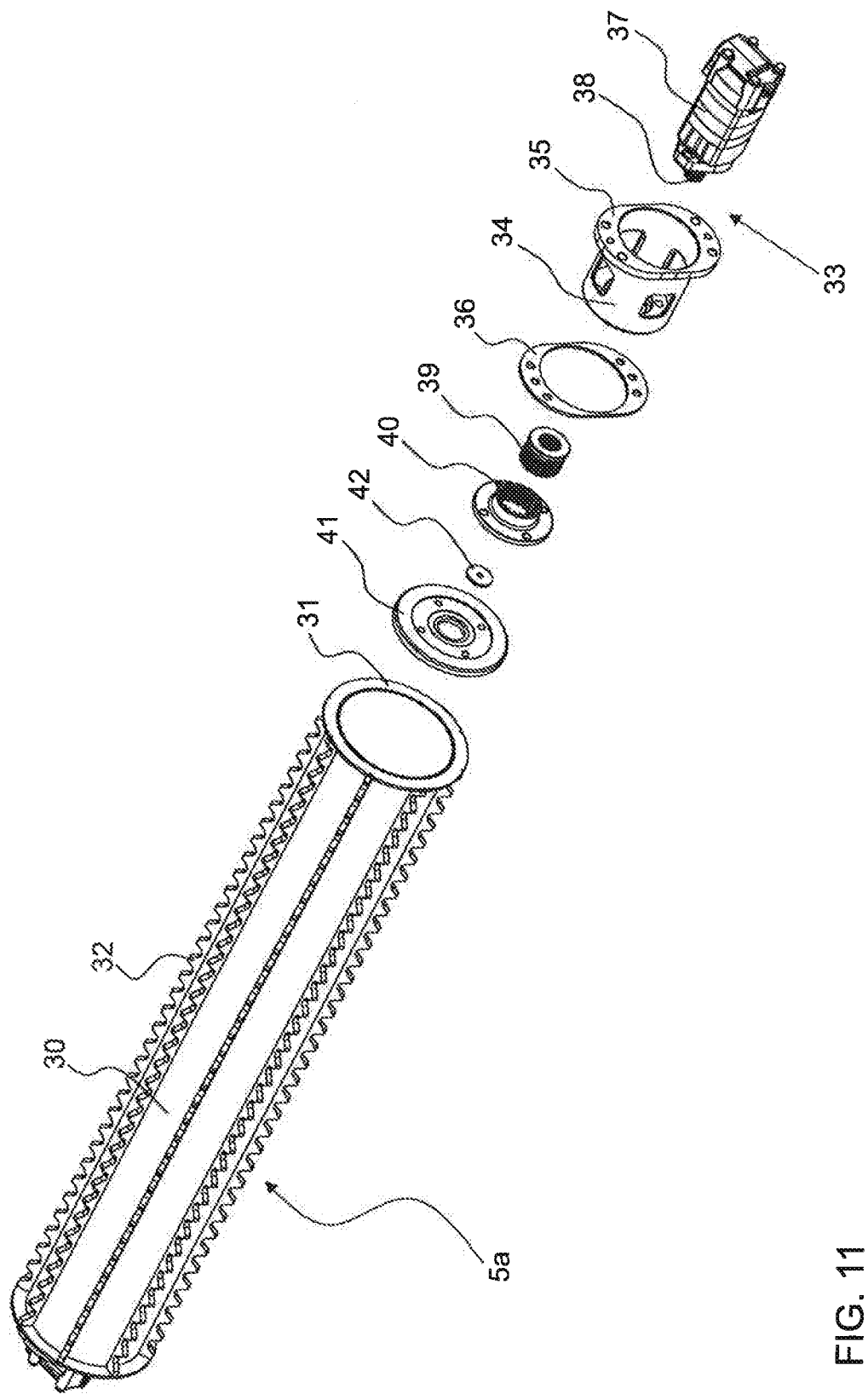
FIG. 11 shows a detailed, exploded, perspective view of the stationary rollers which pull the plant to be chopped.
Figure 12:
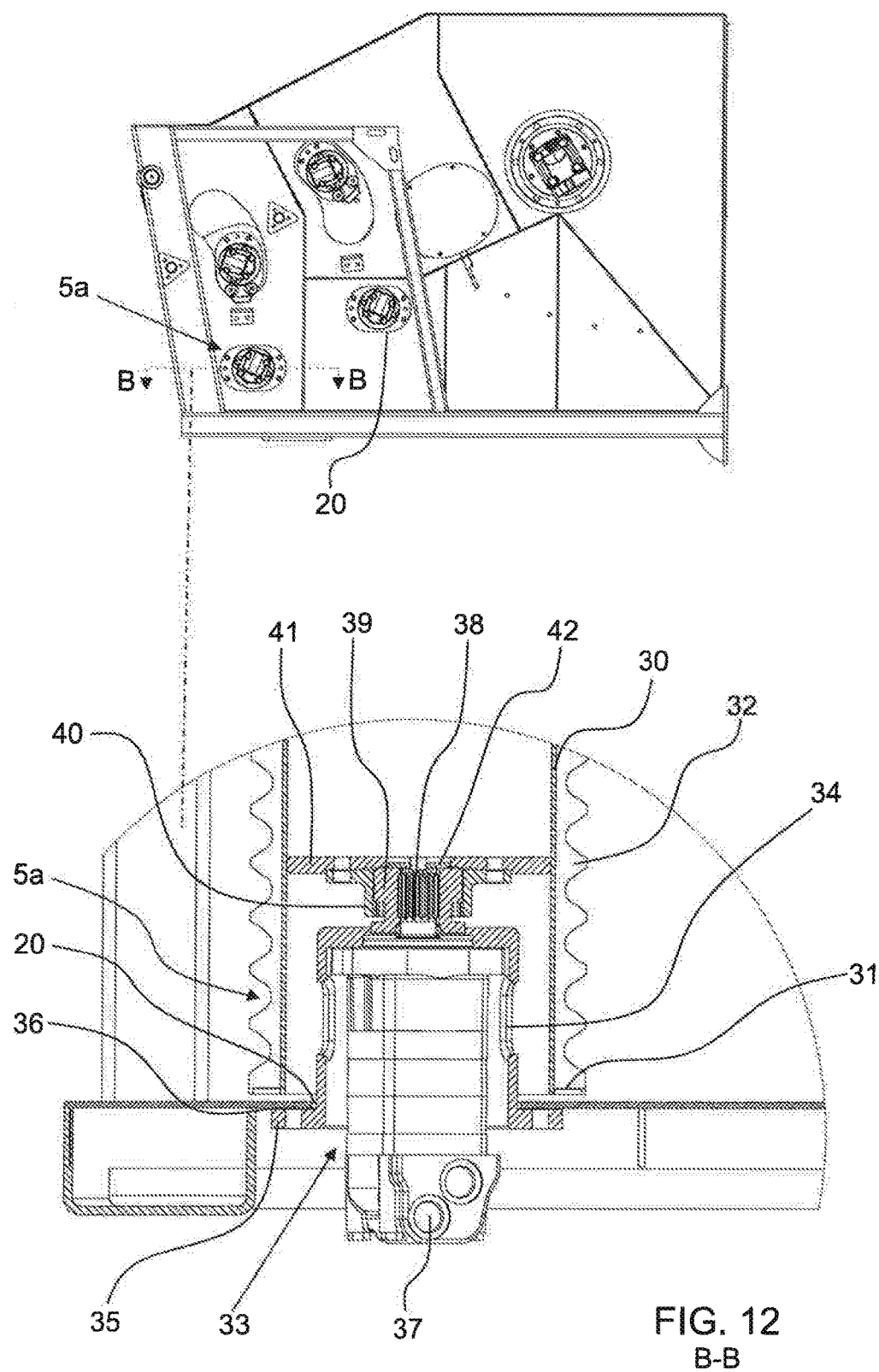
FIG. 12 shows an upper side view and a detailed, magnified cut view, highlighting the assembly of one of the stationary rollers which pull the plant to be chopped.

FIGS. 10, 11 and 12 show in detail one of the lower pair of stationary rollers (5a), which is formed by a tube (30) which, includes internal flanges (31) at its edges, and radially distributes jaws in the form of toothed bands (32) along its circumference. The two edges of each of the lower pair of stationary rollers (5a) are equally coupled to identical hydraulic actuators (33), each one formed by a cylindrical hub (34), fittable to the respective circular openings (20), wherein they are fixed by its flanges (35) and respective reinforcements (36). Inside the cylindrical hub (34), a hydraulic motor (37) is embedded and fixed. The hydraulic motor (37) has its driven shaft (38) turned inwards and crossing the bottom of the cylindrical hub (34), after which it receives a bound bushing (39). The bound bushing (39) engages with a flanged bushing (40) fixed to a roller disc (41) which, includes an abutment ring (42), and is also fixed to the internal diameter of the tube (30) at an appropriate depth for the respective portion of the cylindrical hub (34) to be embedded inside the tube (30). Therefore, we can observe that hydraulic actuators (33) at both ends of the lower pair of stationary rollers (5a) allows the lower pair of stationary rollers (5a) to be turned firmly and ensures equal pulling forces along the lengths of the lower pair of stationary rollers (5a), thus avoiding fatigue at their edges and consequently also enhancing the operation of the toothed bands (32).

Figure 13:
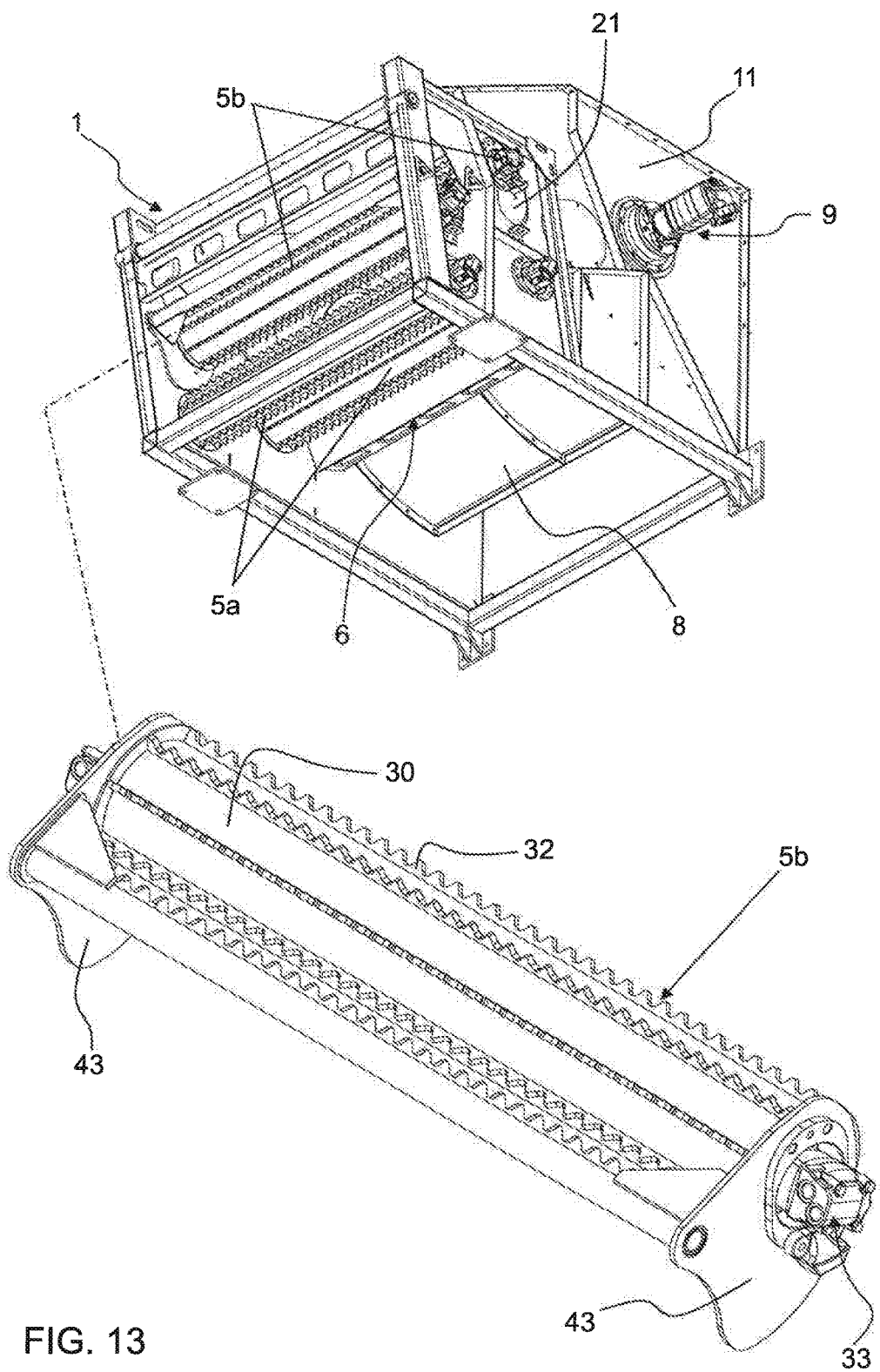
FIG. 13 shows a reference perspective view and a perspective view of one of the floating rollers which pull the plant to be chopped.
Figure 14:
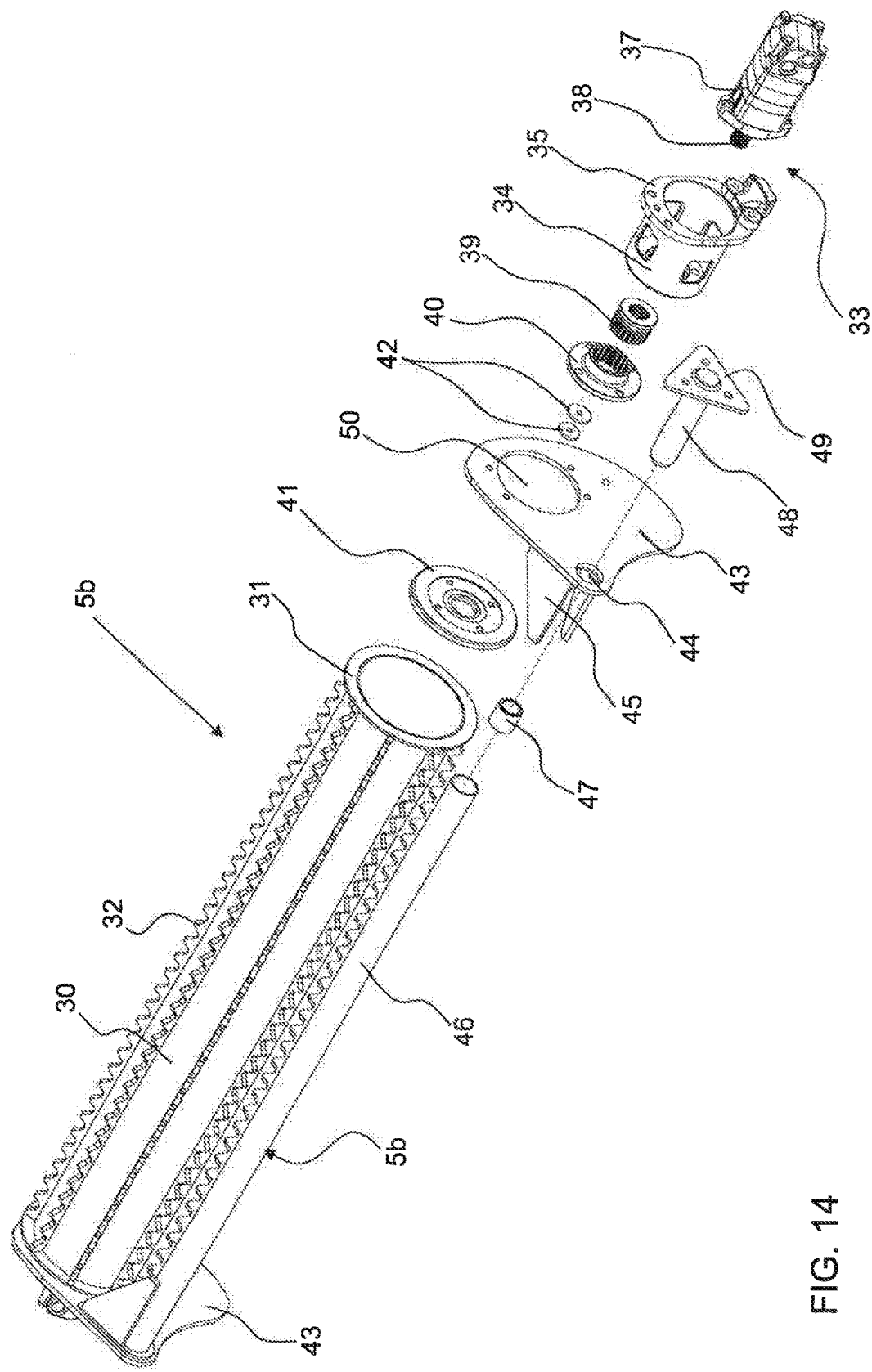
FIG. 14 shows a detailed exploded perspective view of the floating rollers which pull the plant to be chopped.
Figure 15:
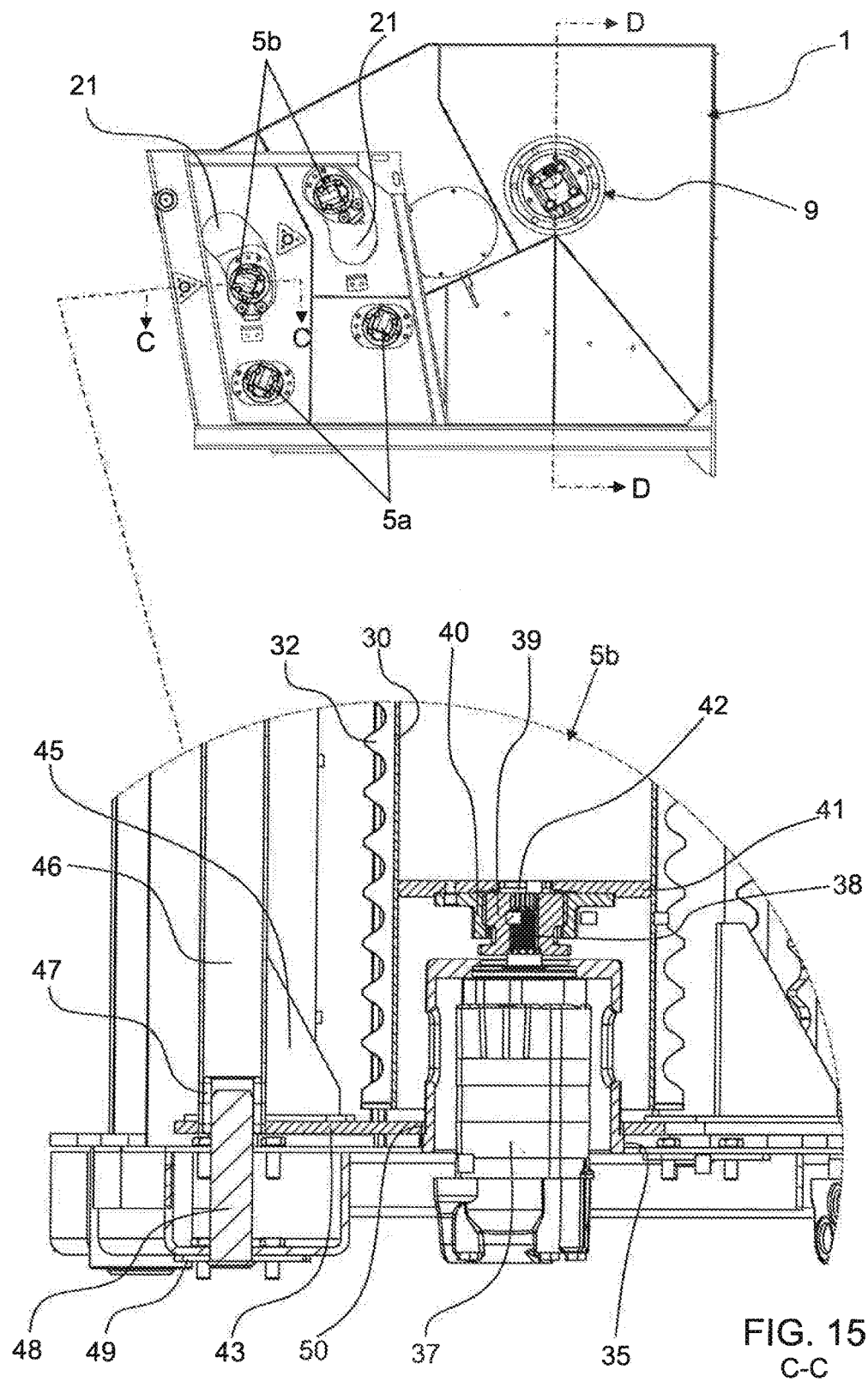
FIG. 15 shows an upper side view and a detailed magnified cut view, highlighting the assembly of one of the floating rollers which pull the plant to be chopped.

FIGS. 13, 14 and 15 show in detail one of the upper pair of floating rollers (5b), which are similar to the lower pair of stationary rollers (5a), except for the means of fixing their edges, which is performed in a floating way in the oblong openings (21). The means of fixing the upper pair of floating rollers (5b) thus comprising, at each edge, a drop-shaped arm plate (43) having a more acute side with a first drop-shaped arm plate hole (44) positioned between roller reinforcements (45). The respective edge of a fixed tube (46) and respective internal bushings (47) are fixed between the roller reinforcements (45), the latter ones having rotatory engagement for the edges of end pins (48). The opposed edges of end pins (48) have fixing plates (49) fixed to the respective side panels (11) and (12). Said plate arms (43) are close to the internal part of said side panel (11) and (12), wherein said plate arms (43) have a second drop-shaped arm plate hole (50) which, is aligned to the oblong openings (21), and receives the cylindrical hubs (34). The flanges (35) of the cylindrical hubs (34) are fixed to the drop-shaped plate arms (43). Consequently, the edges of each of the upper pair of floating rollers (5b) are free to move alongside the oblong openings (21), where they cross said cylindrical hubs (34).

With this embodiment, the height of the passageway (7) formed between the lower pair of stationary rollers (5a) and the upper pair of floating rollers (5b) is self-adjusted or automatically adjusted according to the volume of plants which is caught and pulled inside the machine. Obviously, said effect is provided by the floating assembly of the upper pair of floating rollers (5b).

Figure 16:
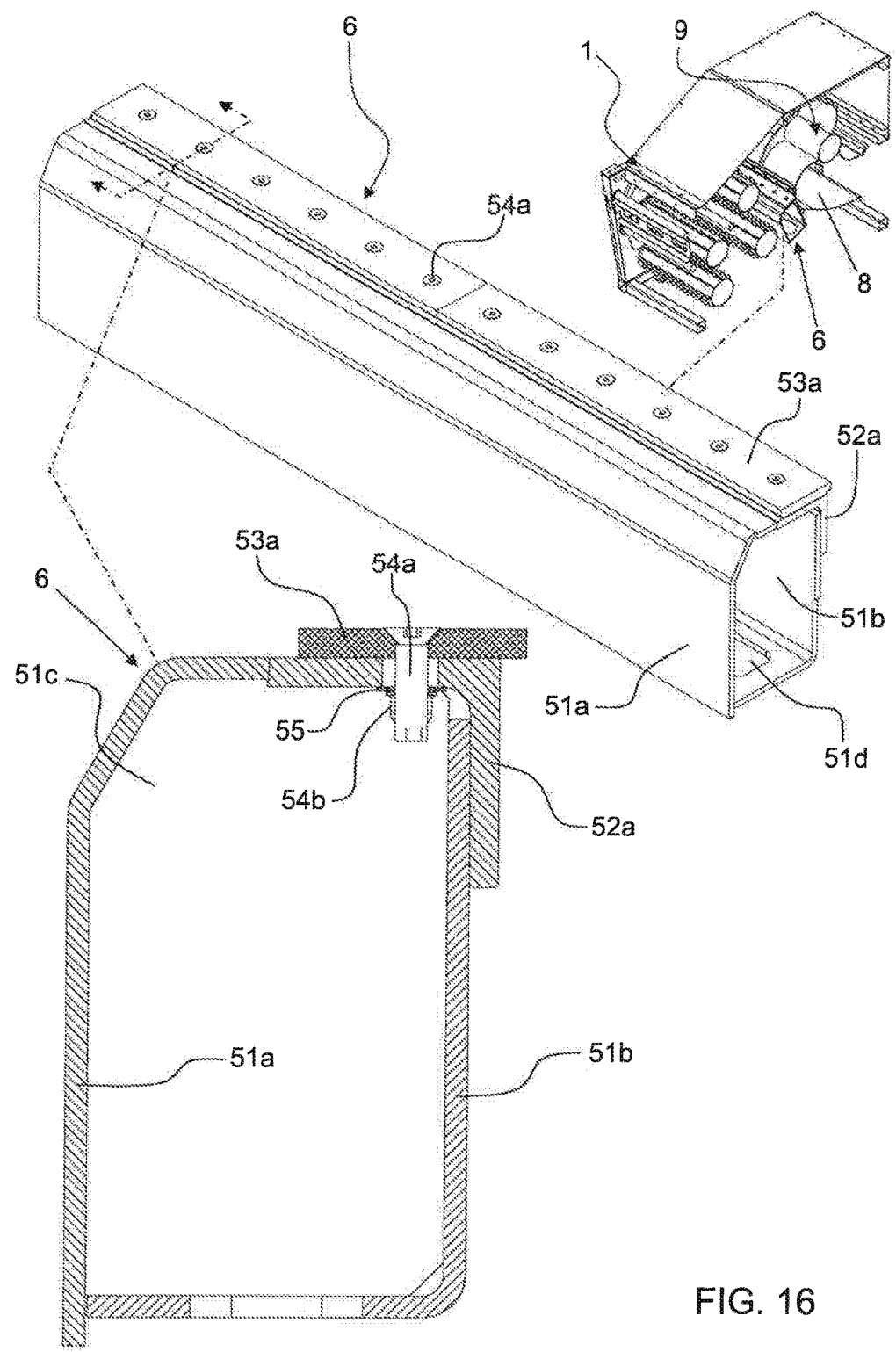
FIG. 16 shows three figures detailing the fixed blade set, an isometric reference cut view, a perspective view of only the assembled fixed shearbar, and a crosswise cut view of the fixed shearbar.
Figure 17:
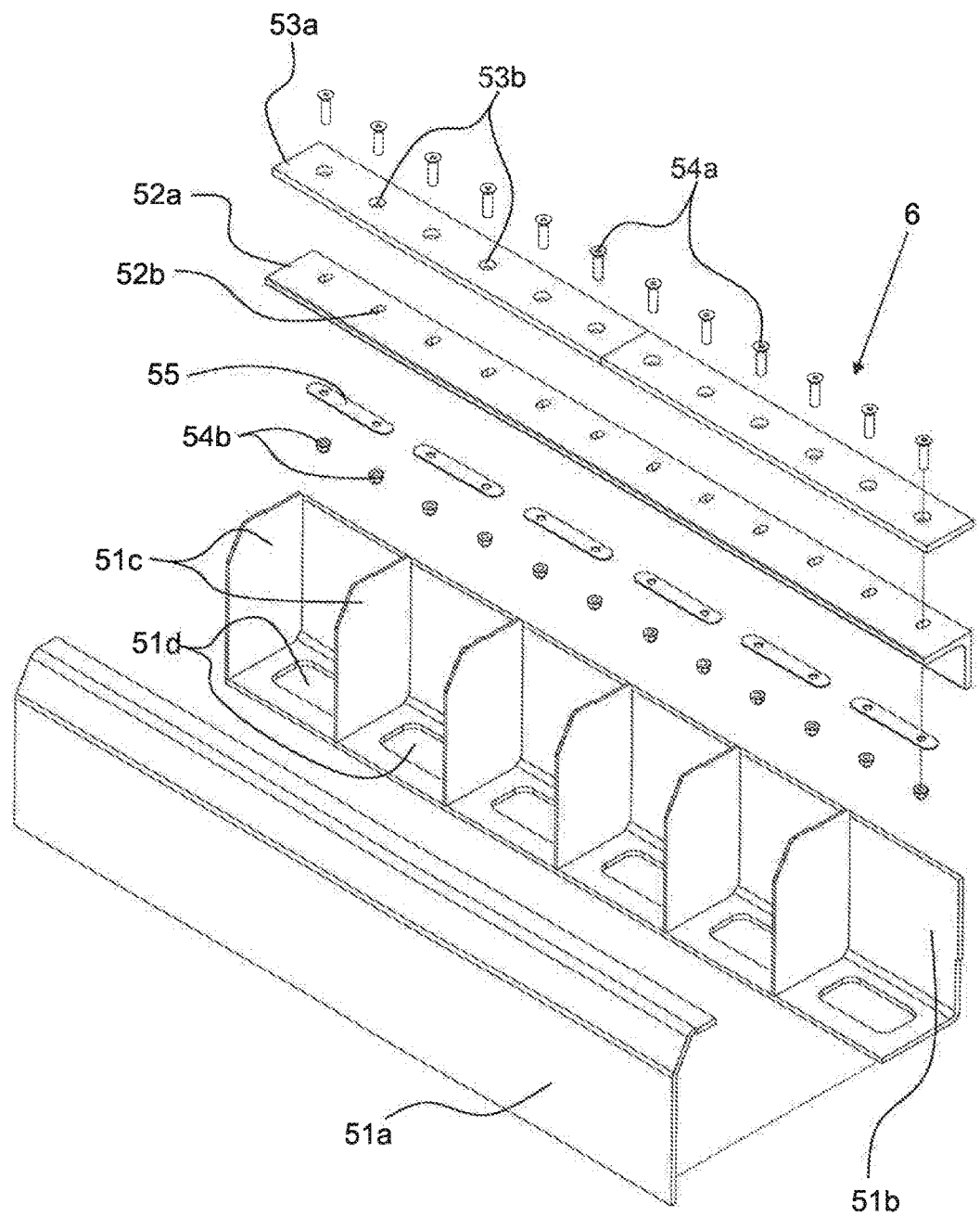
FIG. 17 shows a detailed exploded perspective view of each one of the components of the fixed shearbar.
Figure 18:
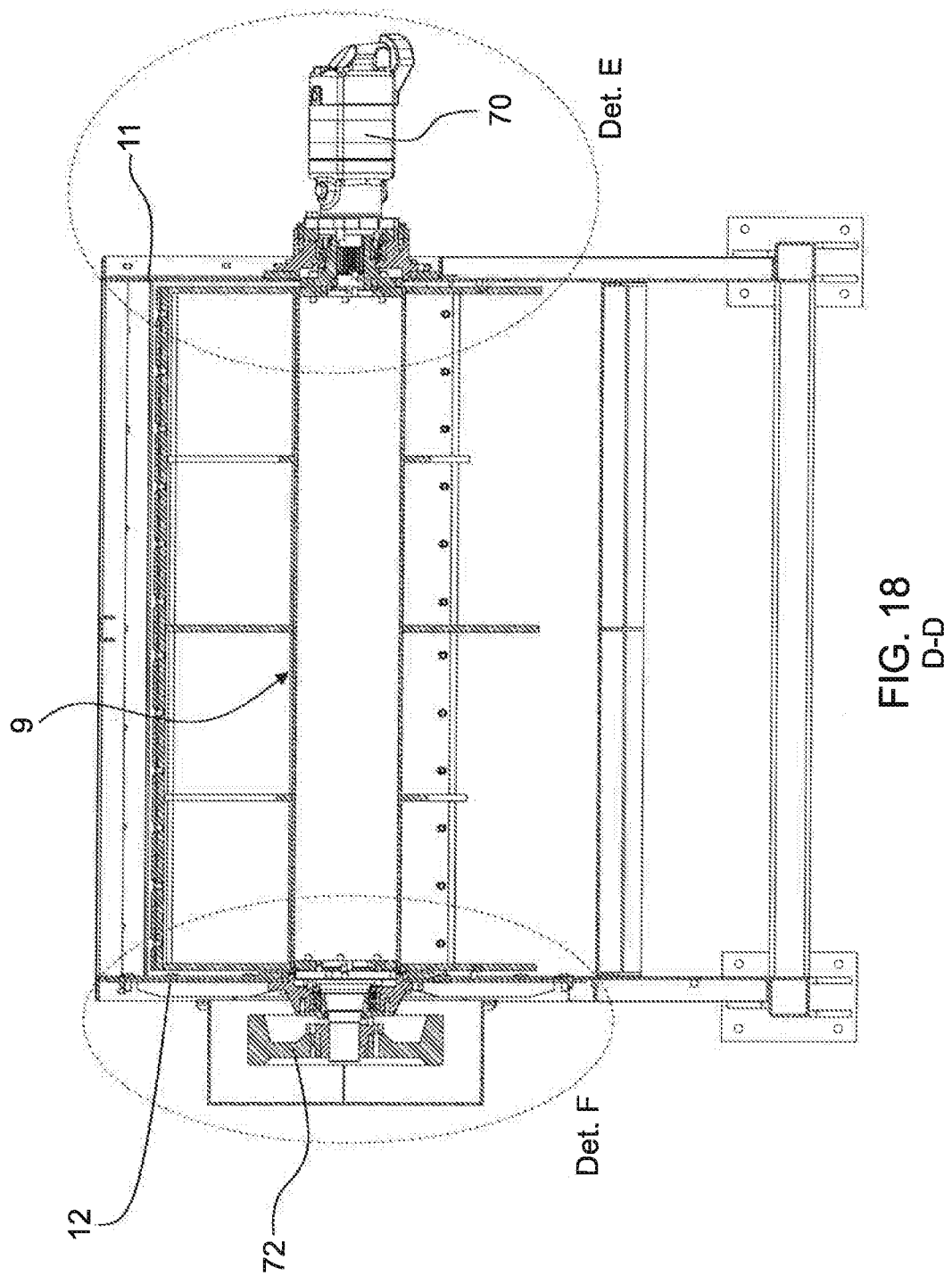
FIG. 18 shows a crosswise cut view "D-D" indicated in FIG. 15, showing details of the rotating blade assembly.
Figure 19:
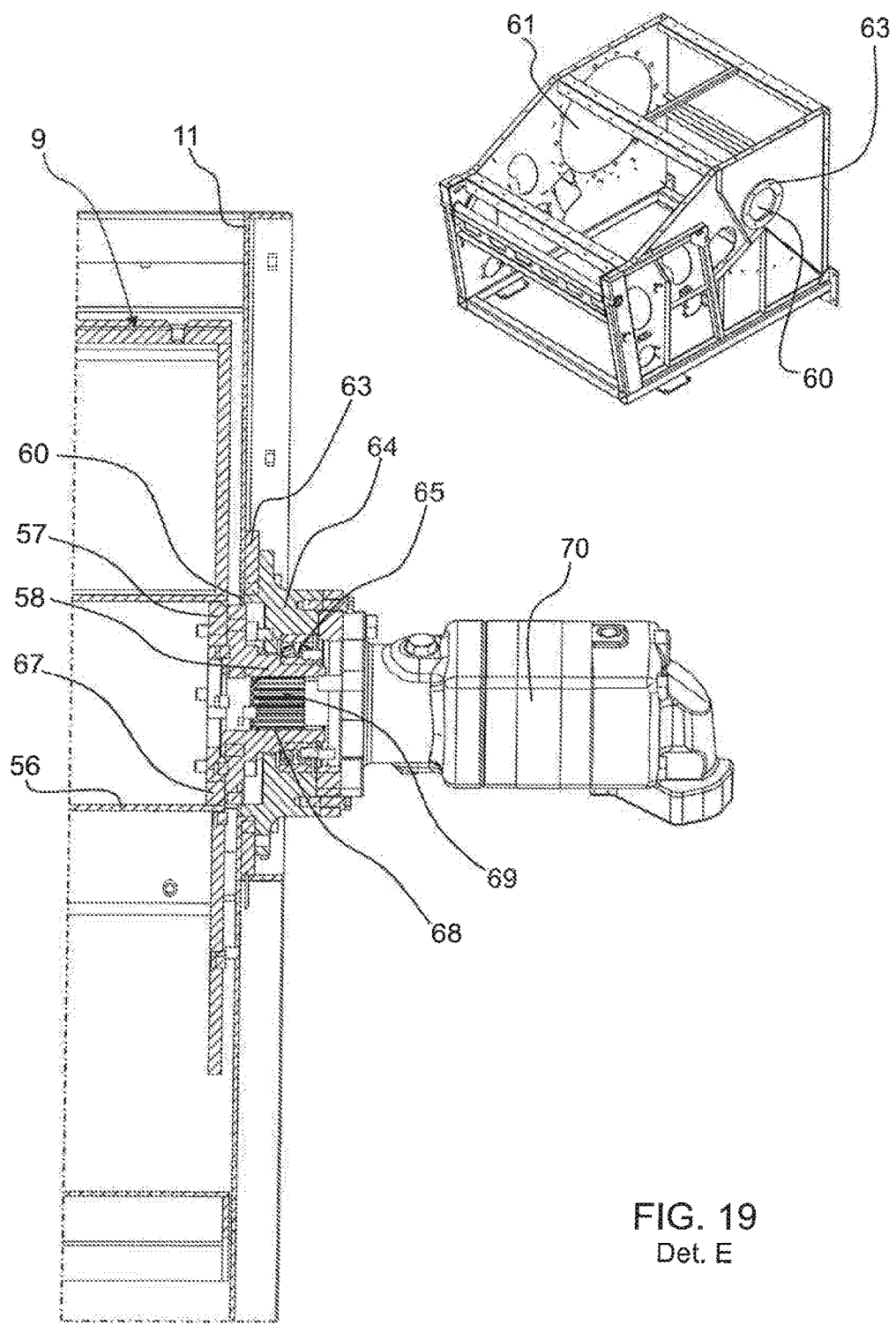
FIG. 19 shows a magnified view of "E" as indicated in FIG. 18, showing in detail the hydraulic actuators as assembled on one of the edges of the rotating blade assembly.
Figure 20:
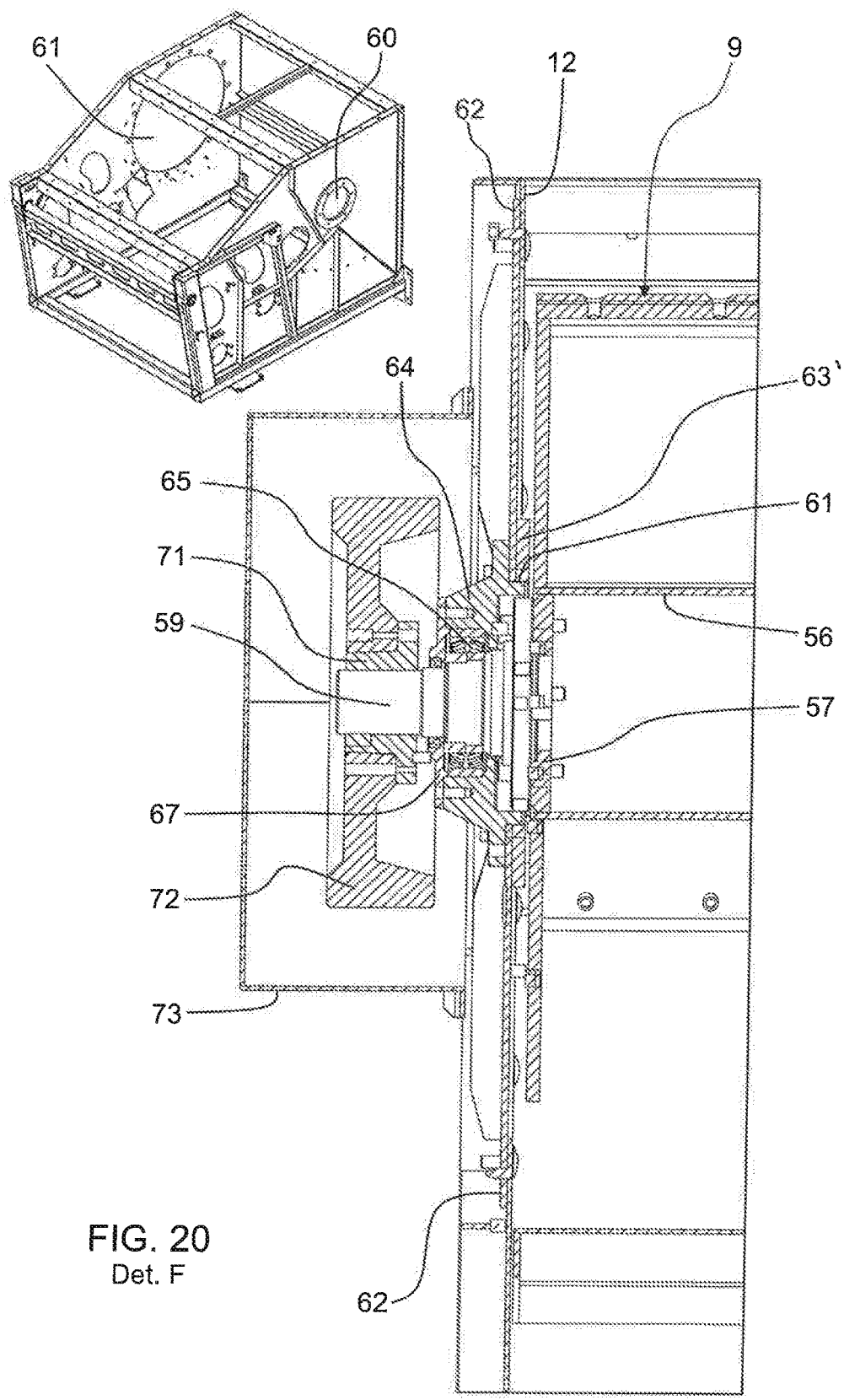
FIG. 20 shows a magnified view of "F" as indicated in FIG. 18, showing in detail the steering wheel/counterweight as assembled on one of the edges of the rotating blade assembly.
Figure 21:
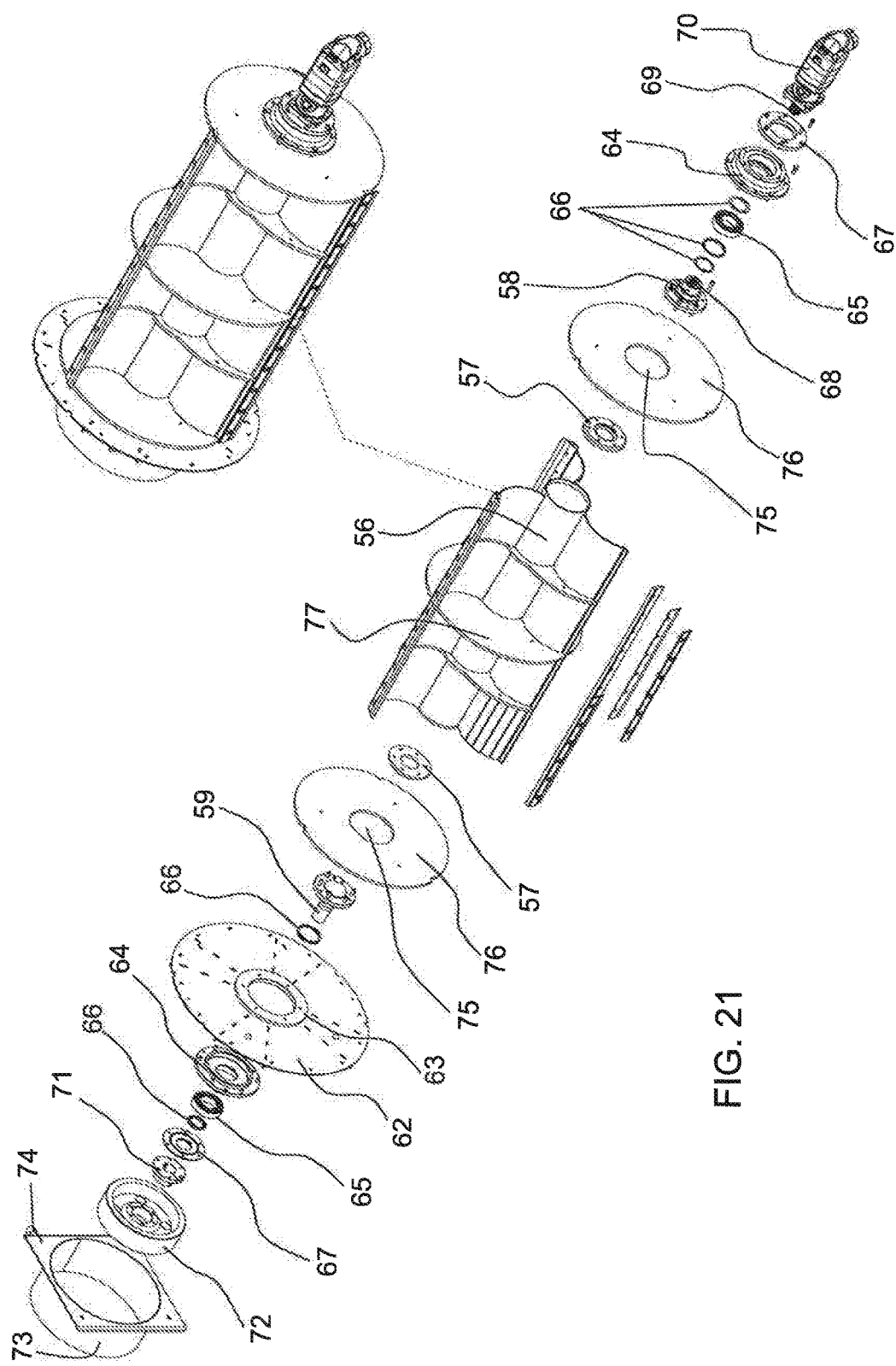
FIG. 21 shows a reference perspective view of the rotating blade assembly as assembled, and an exploded perspective view detailing each component of the device, both perspective views taken from the side of the hydraulic motor.
Figure 22:
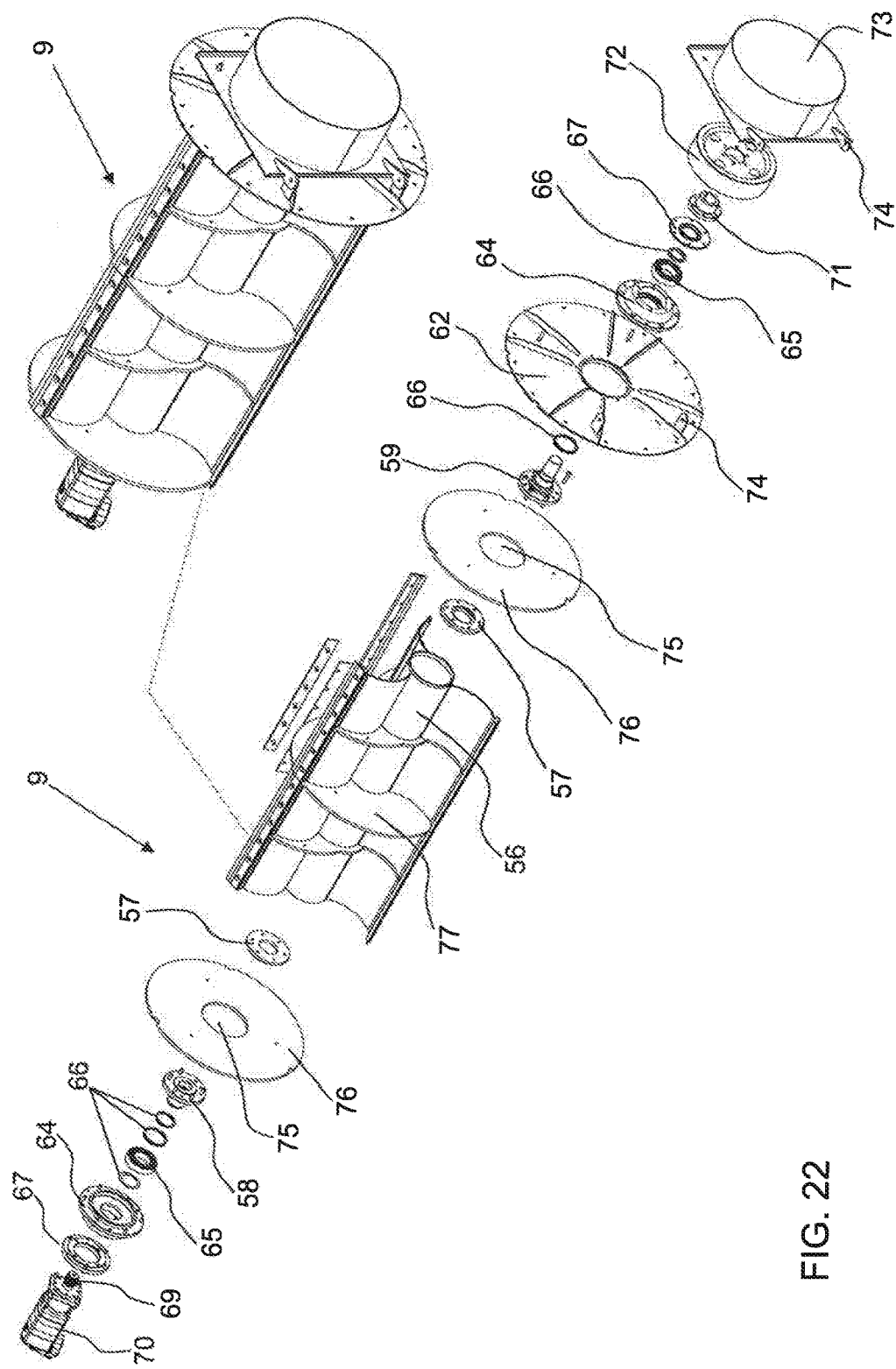
FIG. 22 shows two identical views to the previous ones, but from a different angle and on the side of the steering wheel/counterweight, showing other details of the rotating blade assembly.
Figure 23:
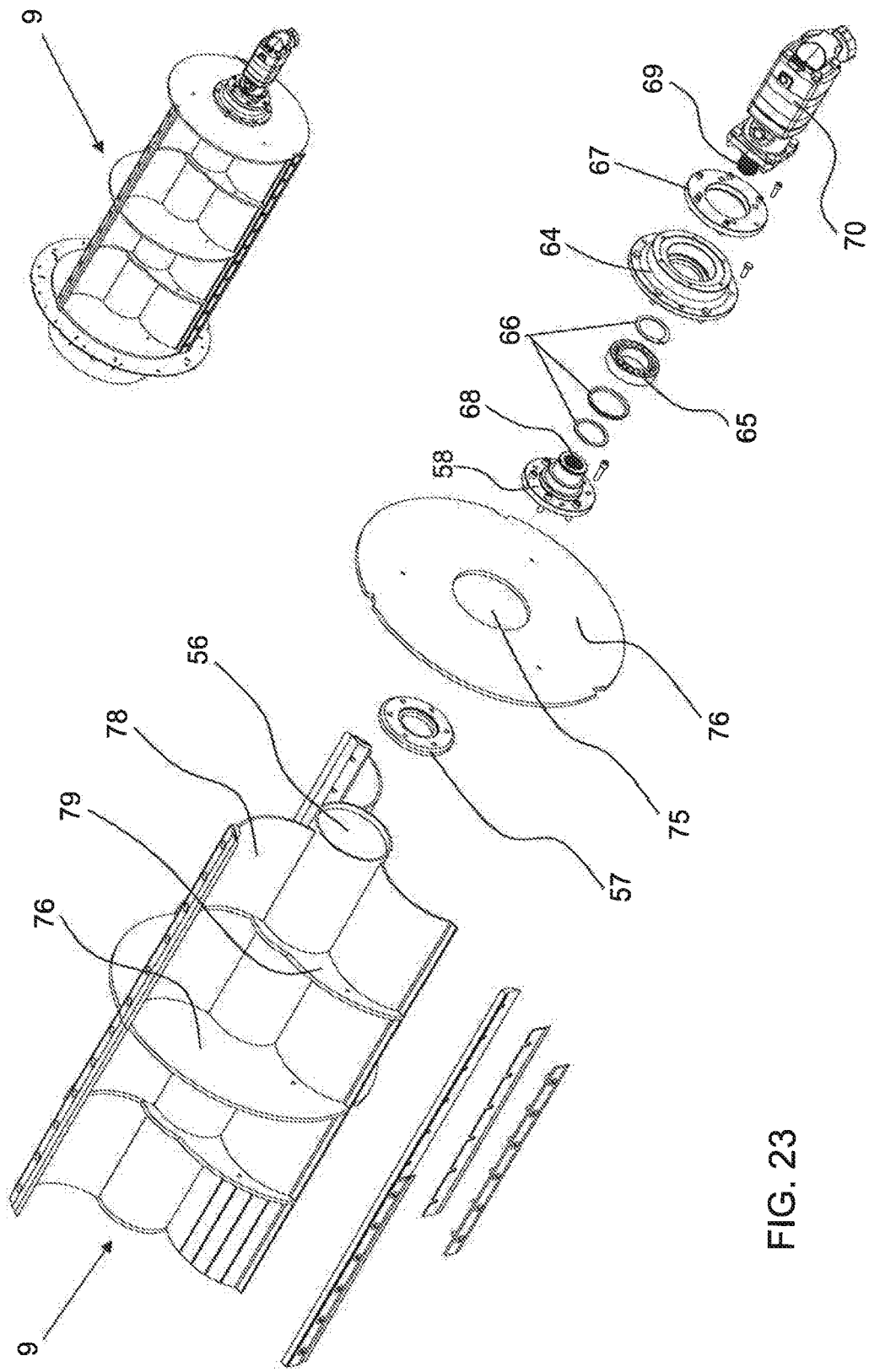
FIG. 23 is a reference perspective view, and a detailed magnified perspective view, as shown by FIG. 21, showing in further detail the side with hydraulic actuators of the rotating blade assembly.
Figure 24:
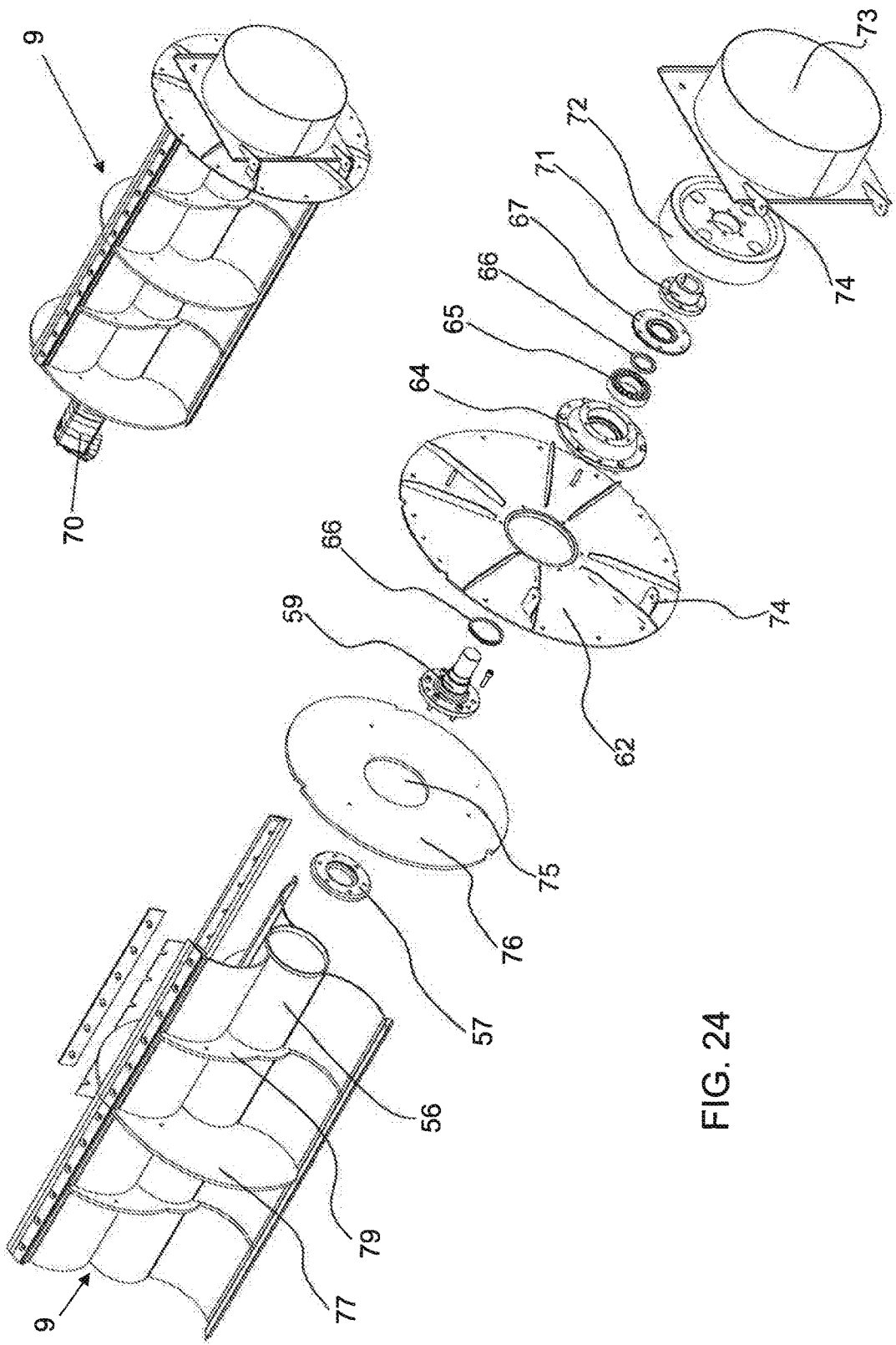
FIG. 24 also shows a reference perspective view, and a detailed magnified perspective view, as shown by FIG. 22, showing in further detail the side with the steering wheel/counterweight.
Figure 25:
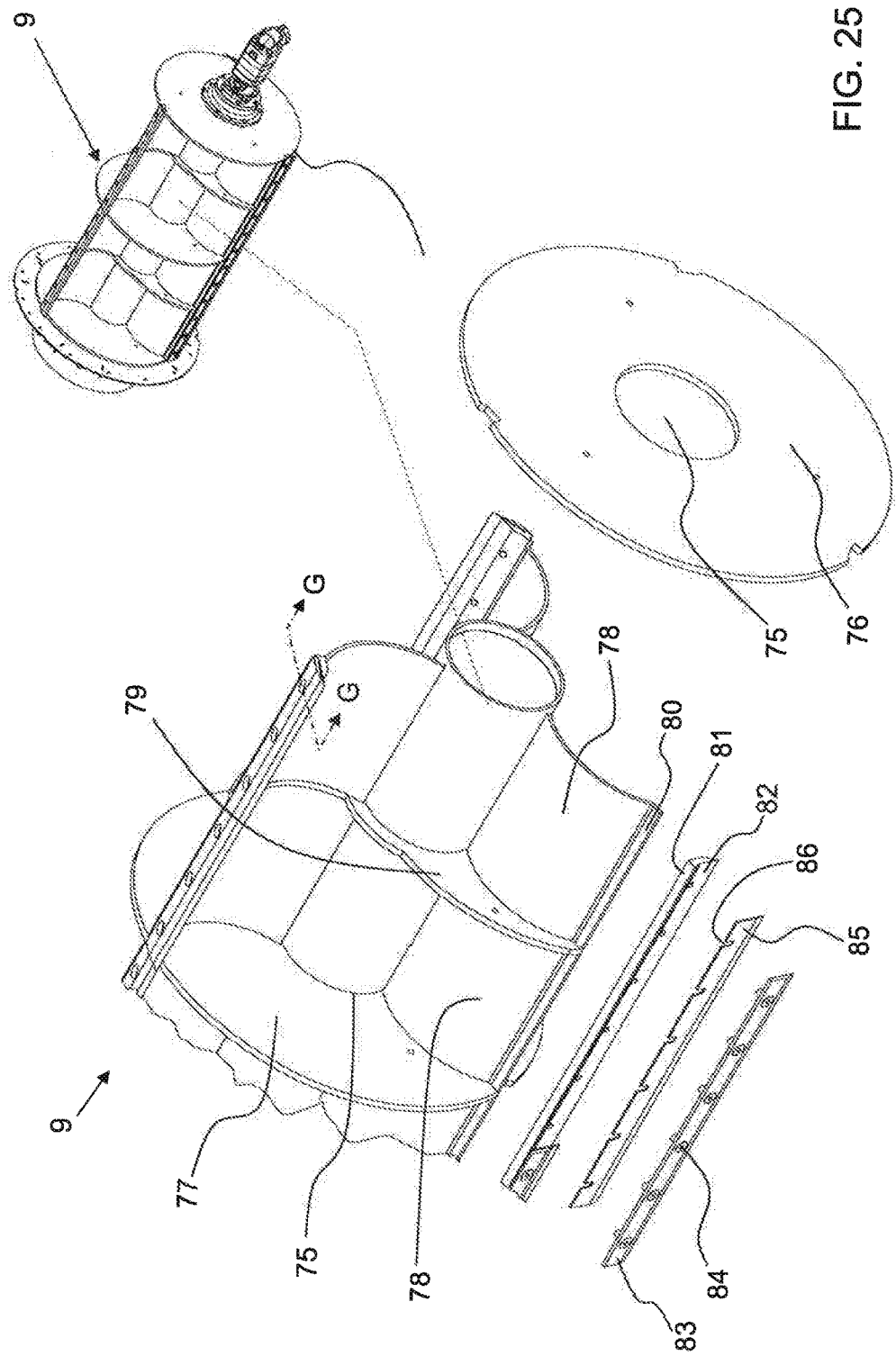
FIG. 25 shows a reference view of the rotating blade assembly, and a detailed, partially exploded, magnified, perspective view of the rotating blade assembly.
Figure 26:
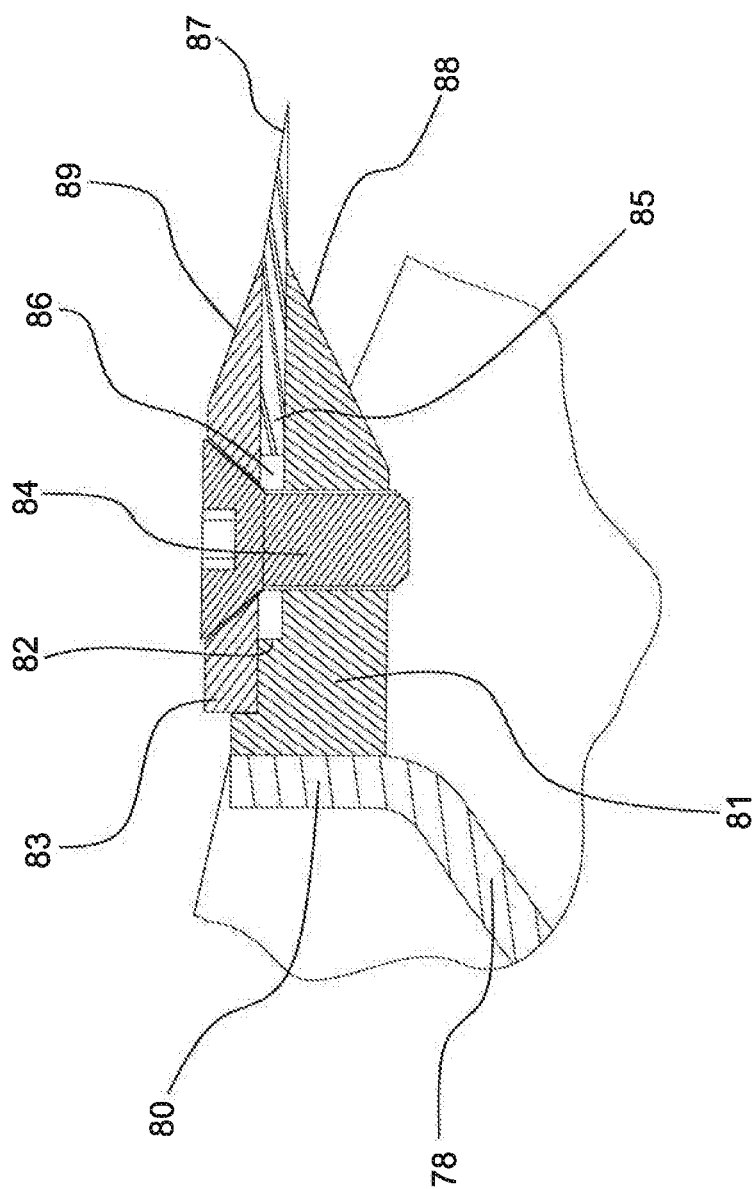
FIG. 26 is a magnified view of the "G-G" cut, shown in FIG. 25, showing in detail the components forming the cutting part of the rotating blade assembly.

FIGS. 16 and 17 show in detail the arrangement of the fixed shearbar (6), wherein we verify that it is formed by a substantially box-shaped structure with rectangular cross section defined by two L-shaped profiles, wherein a first L-shaped profile (51a) and a second L-shaped profile (51b) are fixed to each other in an opposed way around internal plates (51c). The lower flap of the second L-shaped profile (51b) distributes access openings (51d) between the internal plates (51c). The upper rear apex of the box-shaped structure is completed by an angle bracket (52a). The angle bracket (52a) forms a structural complement to join both L-shaped profiles (51a) and (51b) and configures a fixing plane (53a) over one of its flaps for the fixed shearbar. The fixing plane (53a) and the angle bracket (52a) distribute rows of circular fixing holes (53b) and oblong fixing holes (52b). A series of small fixing plates (55) are positioned beneath the angle bracket (52a). Each small fixing plate (55) is the length of the distance between two adjacent circular fixing holes (53b) with a hole at each end that aligns with a circular fixing hole (53b) and an oblong fixing hole (52b). Shearbar screws (54a) are inserted through the circular fixing holes (53b) in the fixing plane (53a), the oblong fixing holes (52b) in the angle bracket (52a), and through the holes in the small fixing plates and are secured with shearbar nuts (54b).

FIGS. 18 to 24 show in detail the rotating blade assembly (9), formed by a tubular hub (56). The edges of the tubular hub (56) connect to an internal flange (57) on each side. A first shaft (58) is fixed to one internal flange (57) and a second shaft (59) is fixed to the other internal flange (57). The first shaft (58) is secured to the first side panel (11) through a first blade assembly hole (60) in the first side panel (11). The second shaft (59) is secured to the second side panel (12) through a second blade assembly hole (61) in the second side panel (12). The first blade assembly hole (60) is reinforced by a first circular reinforcement (63). The second blade assembly hole (61) is reinforced by a third circular reinforcement (63') and a second circular reinforcement (62). Each of the shafts (58) and (59) pass through a shaft housing (64) for shaft bearings (65) and elastic sealing rings (66), which is sealed by a cap (67). The first shaft (58) has a fitting (68) for coupling a driven shaft (69) of a hydraulic motor (70). The second shaft (59) receives a flanged constituent (71) constituting fixation means for a stirring wheel (72) which, is embedded in a circular protective cover (73) assembled jointly with hinges (74) fixed to the second circular reinforcement (62).

Figure 27:
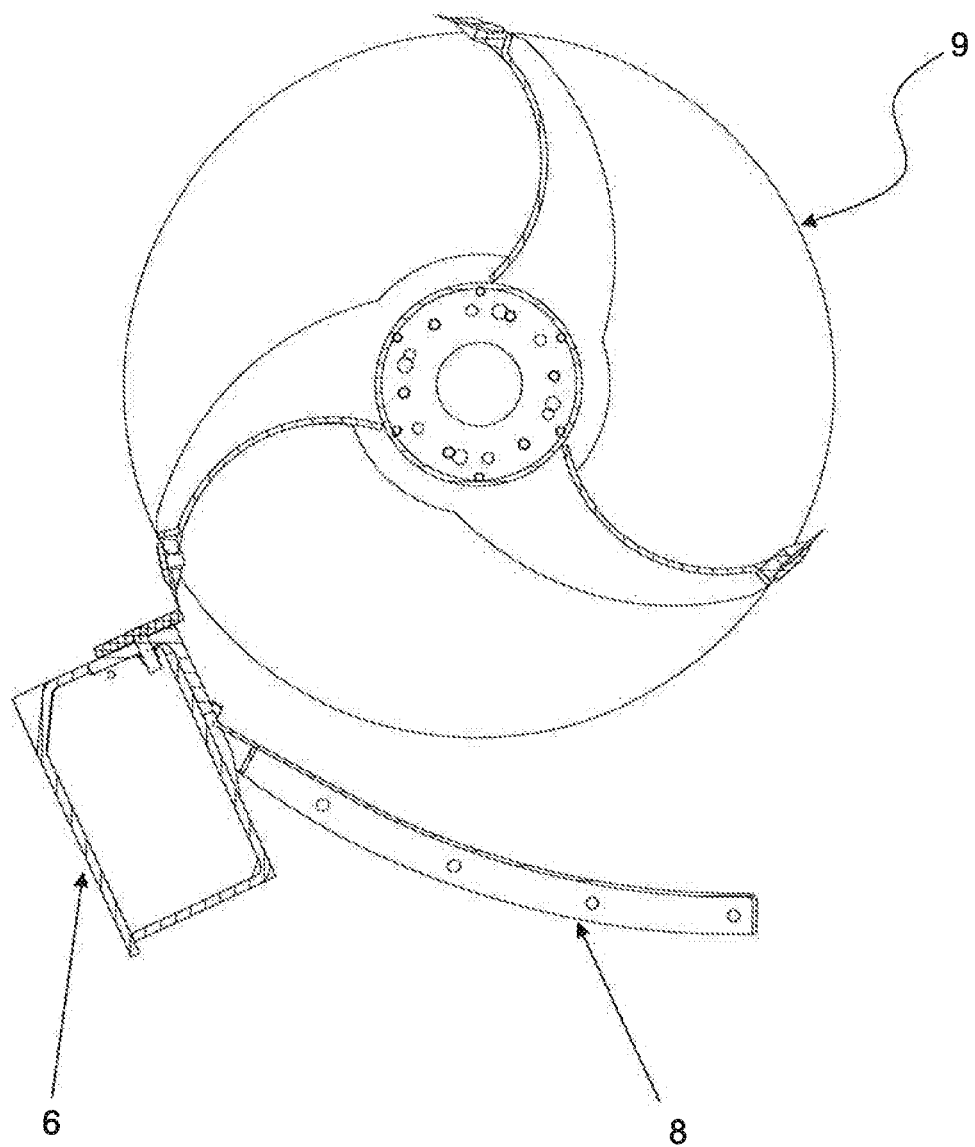
FIG. 27 shows a crosswise cutting view of only the fixed shearbar and the rotating blade assembly, highlighting the fact that the second view has various cutting lines, like a propeller, crossing the shearbar to re-align the cut of the plant.
Figure 28:
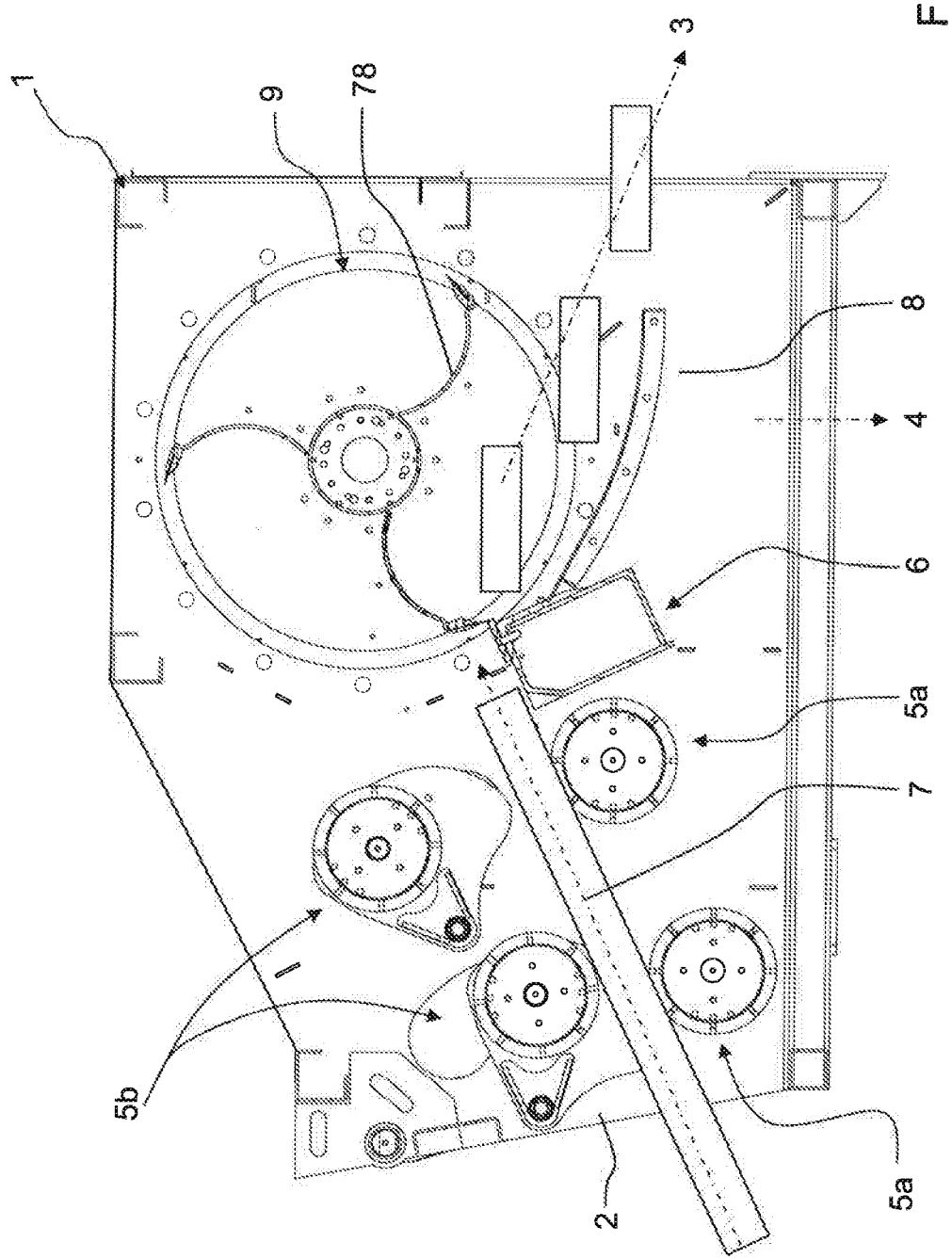
FIG. 28 shows the same view of the "A-A" cut as shown by FIG. 2, but with illustrative details of the operation of the device.

Referring to FIGS. 24 to 27, the edges of the tubular hub (56) are also fitted and fixed into central holes (75) of a first disc and a second disc (76) on the edges of the tubular hub (56) There is also a third disc (77) on the middle section of the tubular hub (56). Curved plates (78) and arched plates (79) are radially positioned along the tubular hub (56), wherein the curved plates are perpendicular to the discs (76) and (77) and the arched plates are parallel to the discs (76) and (77). The curved plates (78) have short straight edges (80), wherein a blade holder (81) is welded. The blade holder (81) has a recess (82) facing outward from the curved plates (78). Fastening strips (83) are fixed by a row of screws (84) to the recess (82), forming a house for blade segments (85). The blade segments (85) include various coincident slots (86) for the row of screws (84). The outward edges of the blade segments (85) are sharpened on a bevel, forming a first cutting edge (87). The blade holder (81) and the fastening strip (83) are also sharpened on a bevel to form a second cutting edge (88) on the blade holder (81) and a third cutting edge (89) on the fastening strip (83). The cutting edges (87), (88), and (89) are inversely combined to form a strong cutting front. As shown by FIGS. 27 and 28, the strong cutting front passes next to the fixed shearbar (6), and the plants passing through said parts are consequently cut with precision and efficiency.

Referring to FIG. 28, the cutting process occurs in synchronism with the pulling rollers (5a-5b) and the displacement of the cut billets rearwards. Accordingly, the rollers (5a) and (5b) grasp the plants to be cut and displace them rearwards, pushing them along the passageway (7) and between the fixed shearbar (6) and the rotating blade assembly (9). At this point, plants are cut and, simultaneously, the curved plates (78) push the cut billets onto the slide (8), throwing the cut billets to the rear outlet (3) establishing a continuous process. Residues, such as earth and other particles released from the plants fall freely through the lower outlet (4).

The invention claimed is:
1. A chopping module comprising:
a box-shaped body, comprising,
 a front inlet;
 a rear outlet, and
 a lower outlet;
a lower pair of stationary rollers positioned crosswise adjacent to the front inlet;
an upper pair of floating rollers positioned crosswise adjacent to the front inlet and above the lower pair of stationary rollers;
a fixed shearbar positioned crosswise adjacent to the lower pair of stationary rollers, and
a rotating blade assembly positioned crosswise adjacent to the fixed shearbar;
wherein the front inlet receives harvested plants to be chopped plant;

wherein, a passageway for the plants to be chopped is defined between the upper pair of floating rollers and the lower pair of stationary rollers; and wherein, a slide is positioned adjacent to the fixed shearbar and below the rotating blade assembly which guides chopped plants to the rear outlet, and wherein the lower outlet receives the residues from the slide; and wherein the box-shaped body further comprises:
a first side panel comprising:
a first opening;
a cover for the first opening;
two circular openings; and
two oblong openings;
a second side panel comprising:
a rectangular opening aligned with the first opening in the first side panel;
two circular openings aligned with the two circular openings in the first side panel; and
two oblong openings aligned with the two oblong openings in the first side panel;
a first square formed of at least four metal tubes adjacent to the inlet of first side panel;
a second square formed by at least four metal tubes adjacent to the inlet of the second side panel; and
a lower frame;
wherein, the lower frame limits the lower outlet and provides support for the first side panel and the second side panel;
wherein, the first side panel and the second side panel have contouring flaps and reinforcement ribs on an outside and are interconnected by a front metal crossbeam and a plurality of upper and rear metal crossbeams on an inside;
wherein, the front metal crossbeam, the lower frame, the first side panel and the second side panel limit the front inlet;
wherein, the plurality of upper and rear metal crossbeams comprise at least one metal crossbeam positioned at an upper edge of the box-shaped body and at least one metal crossbeam positioned at a rear of the box-shaped body;
wherein, the at least one rear metal crossbeam limits the rear outlet;
wherein, the plurality of upper and rear metal crossbeams engage at least two cover panels which define two planes;
wherein, a first of the two planes is substantially horizontal plane and a second of the two planes is substantially sloped plane;
wherein, the first opening in the first side panel and the rectangular opening in the second side panel constitute fixing points for the fixed shearbar;
wherein, the two circular openings in the first side panel and the two circular openings in the second side panel constitute fixing points for the lower pair of stationary rollers;
wherein, the two oblong openings in the first side panel and the two oblong openings in the second side panel constitute fixing points for the upper pair of floating rollers;
wherein, the first square provides reinforcement for a first positioning bushing in the first side panel;
wherein, the second square provides reinforcement for a second positioning bushing in the second side panel;

wherein, the first positioning bushing and the second positioning bushing provide support to edges of a round bar which is located above the front metal crossbeam;

wherein, the round bar is a coupling point for coupling the chopping module to a harvester, and wherein, the lower frame distributes lower plate portions and rear plate portions which form fixing points for coupling the chopping module to the harvester.

2. A chopping module comprising:
a box-shaped body, comprising,
a front inlet;
a rear outlet, and
a lower outlet;
a lower pair of stationary rollers positioned crosswise adjacent to the front inlet;
an upper pair of floating rollers positioned crosswise adjacent to the front inlet and above the lower pair of stationary rollers;
a fixed shearbar positioned crosswise adjacent to the lower pair of stationary rollers, and
a rotating blade assembly positioned crosswise adjacent to the fixed shearbar;
wherein the front inlet receives harvested plants to be chopped plant;
wherein, a passageway for the plants to be chopped is defined between the upper pair of floating rollers and the lower pair of stationary rollers; and
wherein, a slide is positioned adjacent to the fixed shearbar and below the rotating blade assembly which guides chopped plants to the rear outlet, and
wherein the lower outlet receives the residues from the slide; and
wherein each of the lower pair of stationary rollers comprises:
a metal tube;
a first internal flange at a first edge of the metal tube;
a second internal flange at a second edge of the metal tube;
a plurality of toothed bands distributed radially around the circumference of the metal tube;
a first hydraulic actuator at the first edge of the metal tube, and
a second hydraulic actuator at the second edge of the metal tube;
wherein, each of the first hydraulic actuator and the second hydraulic actuator comprises:
a cylindrical hub;
a hydraulic motor with a driven shaft;
a bound bushing; and
a flanged bushing;
wherein, the cylindrical hub is fittable to the circular openings in the first side panel and the circular openings in the second side panel;
wherein, when the cylindrical hub is fitted to the circular openings in the first side panel and the circular openings in the second side panel, the cylindrical hub is fixed by a flange and a reinforcement;
wherein, inside the cylindrical hub the hydraulic motor is embedded and fixed;
wherein, the driven shaft of the hydraulic motor passes through the cylindrical hub and receive the bound bushing which engages the flanged bushing;
wherein, the flanged bushing is fixed to a roller disc; and
wherein, the roller disc includes an abutment ring and is fixed inside the metal tube at a sufficient depth to embed the entire cylindrical hub inside the metal tube.

3. A chopping module of comprising:
a box-shaped body, comprising,
   a front inlet;
   a rear outlet, and
   a lower outlet;
a lower pair of stationary rollers positioned crosswise adjacent to the front inlet;
an upper pair of floating rollers positioned crosswise adjacent to the front inlet and above the lower pair of stationary rollers;
a fixed shearbar positioned crosswise adjacent to the lower pair of stationary rollers, and
a rotating blade assembly positioned crosswise adjacent to the fixed shearbar;
wherein the front inlet receives harvested plants to be chopped plant;
wherein, a passageway for the plants to be chopped is defined between the upper pair of floating rollers and the lower pair of stationary rollers; and
wherein, a slide is positioned adjacent to the fixed shearbar and below the rotating blade assembly which guides chopped plants to the rear outlet, and
wherein the lower outlet receives the residues from the slide; and
wherein each of the upper pair of floating rollers comprises,
   a metal tube;
   a first internal flange at a first edge of the metal tube;
   a second internal flange at a second edge of the metal tube;
   a plurality of toothed bands distributed radially around a circumference of the metal tube;
   a first hydraulic actuator at the first edge of the metal tube; and
   a second hydraulic actuator at the second edge of the metal tube;
wherein, each of the first hydraulic actuator and the second hydraulic actuator comprises:
   a cylindrical hub;
   a hydraulic motor with a driven shaft;
   a bound bushing, and
   a flanged bushing;
wherein, the cylindrical hub is secured to a drop-shaped arm plate which is fittable to the oblong openings in the first side panel or the oblong openings in the second side panel;
wherein the drop-shaped arm plate comprises:
   a first drop-shaped arm plate hole;
   at least two roller reinforcements positioned around the first drop-shaped arm plate hole; and
   a second drop-shaped arm plate hole;
wherein, a fixed tube is secured between a first drop-shaped arm plate at the first edge of the metal tube and a second drop-shaped arm plate hole at the second edge of the metal tube;
wherein, a first internal bushing is present at a first edge of the fixed tube and a second internal bushing is present at a second edge of the fixed tube;
wherein, each edge of the fixed tube is fixed to the respective drop-shaped arm plate by an end pin inserted through the respective first drop-shaped arm plate hole into the respective internal bushing of the fixed tube;
wherein, each end pin has a fixing plate which is fixed to either the first side panel or the second side panel;
wherein, the second drop-shaped arm plate hole of each drop-shaped arm plate is aligned to the oblong openings in the first side panel or the oblong openings in the second side panel; and
wherein, each second drop-shaped arm plate hole receives the respective cylindrical hub and is fixed by a flange.

4. A chopping module comprising:
a box-shaped body, comprising,
   a front inlet;
   a rear outlet, and
   a lower outlet;
a lower pair of stationary rollers positioned crosswise adjacent to the front inlet;
an upper pair of floating rollers positioned crosswise adjacent to the front inlet and above the lower pair of stationary rollers;
a fixed shearbar positioned crosswise adjacent to the lower pair of stationary rollers, and
a rotating blade assembly positioned crosswise adjacent to the fixed shearbar;
wherein the front inlet receives harvested plants to be chopped plant;
wherein, a passageway for the plants to be chopped is defined between the upper pair of floating rollers and the lower pair of stationary rollers; and
wherein, a slide is positioned adjacent to the fixed shearbar and below the rotating blade assembly which guides chopped plants to the rear outlet, and
wherein the lower outlet receives the residues from the slide; and
wherein the fixed shearbar comprises:
   a first L-shaped profile;
   a second L-shaped profile comprising:
      a plurality of internal plates; and
      access openings between the internal plates;
   an angle bracket comprising,
      a plurality of oblong fixing holes;
   a fixing plane comprising,
      a plurality of circular fixing holes spaced in alignment with the plurality of oblong fixing holes in the angle bracket;
   a plurality of shearbar screws;
   a plurality of shearbar nuts; and
   a plurality of small fixing plates;
wherein, the second L-shaped profile distributes the plurality of internal fixing plates evenly across the length of the second L-shaped profile;
wherein, the access openings are situated between each pair of internal fixing plates;
wherein, the plurality of small fixing plates are each the length of the distance between any two adjacent oblong fixing holes in the angle bracket;
wherein, each small fixing plate has a first small hole in a first end and a second small hole in a second end;
wherein, when the first small hole in a small fixing plate is aligned with an oblong fixing hole in the angle bracket the second small hole aligns with an adjacent oblong fixing hole in the angle bracket;
wherein, the first L-shaped profile is secured to the second L-shaped profile by arranging the two L-shaped profiles to form a box shape and inserting the plurality of shearbar screws through the plurality of circular fixing holes in the fixing plane the plurality of oblong fixing holes in the angle bracket and the small fixing plates and securing the plurality of shearbar screws with the plurality shearbar nuts.

5. A chopping module comprising:
a box-shaped body, comprising,
   a front inlet;
   a rear outlet, and
   a lower outlet;

a lower pair of stationary rollers positioned crosswise adjacent to the front inlet;

an upper pair of floating rollers positioned crosswise adjacent to the front inlet and above the lower pair of stationary rollers;

a fixed shearbar positioned crosswise adjacent to the lower pair of stationary rollers, and a rotating blade assembly positioned crosswise adjacent to the fixed shearbar;

wherein the front inlet receives harvested plants to be chopped plant;

wherein, a passageway for the plants to be chopped is defined between the upper pair of floating rollers and the lower pair of stationary rollers; and wherein, a slide is positioned adjacent to the fixed shearbar and below the rotating blade assembly which guides chopped plants to the rear outlet, and wherein the lower outlet receives the residues from the slide; and wherein the rotating blade assembly comprises:
  a tubular hub;
  a first internal flange;
  a second internal flange;
  a first shaft;
  a second shaft;
  a first shaft housing;
  a second shaft housing;
  a first shaft bearing;
  a second shaft bearing;
  a first set of elastic sealing rings;
  a second set of elastic sealing rings;
  a first cap;
  a second cap;
  a hydraulic motor with a driven shaft;
  a flanged constituent;
  a stirring wheel;
  a circular protective cover;
  one or more hinges;
  a first disc;
  a second disc;
  a third disc;
  a plurality of curved plates, and
  a plurality of arched plates;

wherein, the first side panel contains a first blade assembly hole and the second side panel contains a second blade assembly hole;

wherein, the first blade assembly hole is reinforced by a first circular reinforcement on the outside of the first side panel;

wherein, the second blade assembly hole is reinforced by a second circular reinforcement on the outside of the second side panel;

wherein, the second blade assembly hole is further reinforced by a third circular reinforcement on the inside of the second side panel;

wherein, the first cap is secured to the first shaft housing and the first shaft housing is secured to the first shaft;

wherein, the first set of elastic sealing rings and the first shaft bearings are secured between the first shaft housing and the first shaft;

wherein, the second cap is secured to the second shaft housing and the second shaft housing is secured to the second shaft;

wherein, the second set of elastic sealing rings and the second shaft bearings are secured between the second shaft housing and the second shaft;

wherein, the first shaft has a fitting which couples to the driven shaft of the hydraulic motor;

wherein, the hydraulic motor is secured to the first cap;

wherein, the second shaft couples with the flanged constituent;

wherein, the flanged constituent is fixed to the stirring wheel;

wherein, the stirring wheel is embedded in the circular protective cover;

wherein, the circular protective cover is secured to the second circular reinforcement with the one or more hinges;

wherein, a first edge of the tubular hub is secured to the first internal flange and the first internal flange is fixed to a central hole of the first disc;

wherein, a second edge of the tubular hub is secured to the second internal flange and the second internal flange is fixed to a central hole of the second disc;

wherein, the third disc is situated on the tubular hub between the first disc and the second disc;

wherein, the curved plates are distributed radially along the tubular hub perpendicular to the first disc, the second disc, and the third disc;

wherein, the arched plates are radially distributed along the tubular hub parallel to the first disc, the second disc, and third disc;

wherein, each of the curved plates has a short straight edge;

wherein, each short straight edge has a blade holder welded to it;

wherein, each blade holder has a recess and a fastening strip which is fixed to the blade holder by a row of screws forming a housing for blade segments between the blade holder and the fastening strip;

wherein, each blade segment includes a plurality of coincident slots receiving the row of screws;

wherein, an outside edge of each blade segment is sharpened on a bevel to form a first cutting edge;

wherein, an outside edge of each blade holder is sharpened on a bevel to form a second cutting edge;

wherein, an outside edge of each fastening strip is sharpened on a bevel to form a third cutting edge;

wherein, on each short straight edge, the first cutting edge, the second cutting edge, and the third cutting edge are arranged complementary to each other to form a strong cutting front; and wherein, each strong cutting front passes adjacent to the fixed shearbar when the rotating cutting assembly is in operation.

* * * * *